US011932374B2

United States Patent
Sankrithi et al.

(10) Patent No.: US 11,932,374 B2
(45) Date of Patent: Mar. 19, 2024

(54) FREIGHTER AIRCRAFT SYSTEM AND CONTAINER SYSTEM

(71) Applicant: The Boeing Company, Chicago, IL (US)

(72) Inventors: Mithra M. K. V. Sankrithi, Edmonds, WA (US); Sergey D. Barmichev, Kirkland, WA (US); Anapathur Ramesh, Bothell, WA (US)

(73) Assignee: The Boeing Company, Arlington, VA (US)

( * ) Notice: Subject to any disclaimer, the term of this patent is extended or adjusted under 35 U.S.C. 154(b) by 686 days.

(21) Appl. No.: 16/672,423

(22) Filed: Nov. 1, 2019

(65) Prior Publication Data

US 2021/0129972 A1    May 6, 2021

(51) Int. Cl.
*B64C 1/22* (2006.01)
*B64C 1/00* (2006.01)
(Continued)

(52) U.S. Cl.
CPC .................. *B64C 1/22* (2013.01); *B64D 9/00* (2013.01); *B65D 88/121* (2013.01); *B65D 88/14* (2013.01);
(Continued)

(58) Field of Classification Search
CPC .............. B64C 1/22; B64C 2001/0045; B64C 2025/008
See application file for complete search history.

(56) References Cited

U.S. PATENT DOCUMENTS

| 3,405,893 A | * | 10/1968 | Fernand | ................. | B64D 11/00 244/119 |
| 3,595,407 A | * | 7/1971 | Muller-Kuhn | .......... | B64F 1/322 294/67.1 |

(Continued)

FOREIGN PATENT DOCUMENTS

| EP | 0408432 | | 1/1991 | | |
| EP | 0408432 | A1 * | 1/1991 | ............... | B64C 1/10 |

(Continued)

OTHER PUBLICATIONS

"ISO Container Sizes" 2015, Ship Business, (Year: 2015).*
(Continued)

*Primary Examiner* — Joshua J Michener
*Assistant Examiner* — Ryan Andrew Yankey

(57) ABSTRACT

A trunk route aircraft has at least one wing for supporting the aircraft during flight, and at least one propulsor for forward propulsion of the aircraft. The trunk route aircraft further includes a pressurized trunk route fuselage having a double-bubble cross-sectional shape and a generally vertically-oriented longitudinal bulkhead dividing the trunk route fuselage interior into two side-by-side trunk route payload compartments. The longitudinal bulkhead is loaded in tension when the trunk route fuselage is pressurized. The trunk route payload compartments are each configured to receive a plurality of lightweight ISO (International Organization for Standardization) geometry containers arranged end-to-end, or a plurality of container inserts arranged end-to-end, each container insert also configured to be received within the lightweight ISO-geometry container, or a combination of one or more lightweight ISO-geometry containers and one or more container inserts arranged end-to-end.

20 Claims, 24 Drawing Sheets

(51) Int. Cl.
  *B64C 25/00*   (2006.01)
  *B64D 9/00*    (2006.01)
  *B65D 88/12*   (2006.01)
  *B65D 88/14*   (2006.01)
  *B65D 90/00*   (2006.01)

(52) U.S. Cl.
  CPC .. *B65D 90/0066* (2013.01); *B64C 2001/0036* (2013.01); *B64C 2001/0045* (2013.01); *B64C 2025/008* (2013.01)

(56) References Cited

U.S. PATENT DOCUMENTS

| | | | | |
|---|---|---|---|---|
| 3,776,492 | A | * | 12/1973 | Iben .......... B64C 1/22 244/137.1 |
| 4,674,712 | A | * | 6/1987 | Whitener .......... B64C 1/00 244/119 |
| 5,088,661 | A | * | 2/1992 | Whitener .......... B64C 3/00 244/76 R |
| 5,106,038 | A | | 4/1992 | Dupont |
| 6,616,100 | B2 | | 9/2003 | Sankrithi |
| 7,261,257 | B2 | * | 8/2007 | Helou, Jr. .......... B64C 39/02 244/137.1 |
| 7,344,109 | B1 | * | 3/2008 | Rezai .......... B64D 11/00 244/118.6 |
| 8,387,917 | B1 | * | 3/2013 | Grip .......... B64C 1/08 244/119 |
| 8,689,538 | B2 | | 4/2014 | Sankrithi |
| 8,864,079 | B2 | | 10/2014 | Sankrithi |
| 9,533,768 | B2 | | 1/2017 | Barmichev |
| 9,637,234 | B2 | | 5/2017 | Gallant |
| 9,759,160 | B2 | | 9/2017 | Sankrithi |
| 9,868,540 | B2 | | 1/2018 | Barmichev |
| 2006/0108477 | A1 | * | 5/2006 | Helou .......... B64C 39/02 244/137.1 |
| 2007/0025832 | A1 | * | 2/2007 | Rawdon .......... B64D 9/00 414/401 |
| 2009/0114773 | A1 | * | 5/2009 | Helou, Jr. .......... B64D 13/02 414/800 |
| 2015/0097076 | A1 | * | 4/2015 | Lakic .......... B64C 3/38 244/46 |
| 2018/0022435 | A1 | * | 1/2018 | Grip .......... B64C 1/08 244/119 |
| 2018/0194267 | A1 | * | 7/2018 | Helou, Jr. .......... B64C 1/22 |
| 2019/0061963 | A1 | | 2/2019 | Sankrithi |
| 2021/0086898 | A1 | * | 3/2021 | Pfau .......... B64D 9/00 |

FOREIGN PATENT DOCUMENTS

| | | | | |
|---|---|---|---|---|
| EP | 0899189 | | 3/1999 | |
| EP | 2554474 | | 2/2013 | |
| EP | 2554474 | A1 * | 2/2013 | .......... B64C 25/08 |
| EP | 3272641 | A1 * | 1/2018 | .......... B64C 1/08 |
| GB | 913783 | A * | 10/1960 | .......... B64C 39/02 |
| GB | 913783 | | 12/1962 | |

OTHER PUBLICATIONS

John Pike, C-5A/B Galaxy, Nov. 2, 2016, FAS (Year: 2016).*
"Practical Application of Pressurization Systems," Nov. 19, 2017, University of Oklahoma (Year: 2017).*
"The Amazing Way Cargo is Loaded onto a C-5 Galaxy Plane" May 31, 2019, Smithsonian Channel (Year: 2019).*
Mcclellan, Flashback to 1981 a Look Back at the Lear Fan, Jun. 4, 2006, Flying Magazine (Year: 2006).*
Spakovszky, Unified: Thermodynamics and Propulsion, 2008, MIT, Chapter 13.3 (Year: 2008).*
"Messerschmidt Me 321 Gigant Aircraft," Oct. 16, 2018, Filders Green (Year: 2018).*
Robert Guttman, "Flying Container Ship: The XC-120," Jul. 26, 2018, HistoryNet (Year: 2018).*
Anonymous, "Cabin Layout and Fuselage Geometry," Sep. 18, 2017 (Sep. 18, 2017), pp. 1-51, XP055786259; available at <URL:http://wpage.unina.it/fabrnico/DIDATTICA/PGV_2012/MAT_DID_CORSO/07_Prog_Fusoliera/Fuselage_Design_Stanford.pdf>.
EPO, Search Report for Appl. No. 20205074.6, dated Mar. 25, 2021.
Wikipedia, "Intermodal Container," retrieved Aug. 20, 2019.
Wikipedia, "ISO 668 standard," retrieved Aug. 20, 2019.
International Organization for Standardization (ISO), "ISO 668—Series 1 freight containers—Classification, dimensions and ratings," Jan. 8, 2013.
International Organization for Standardization (ISO), "ISO 1161—Series 1 freight containers—Corner and intermediate fittings—Specifications," Jul. 15, 2016.

* cited by examiner

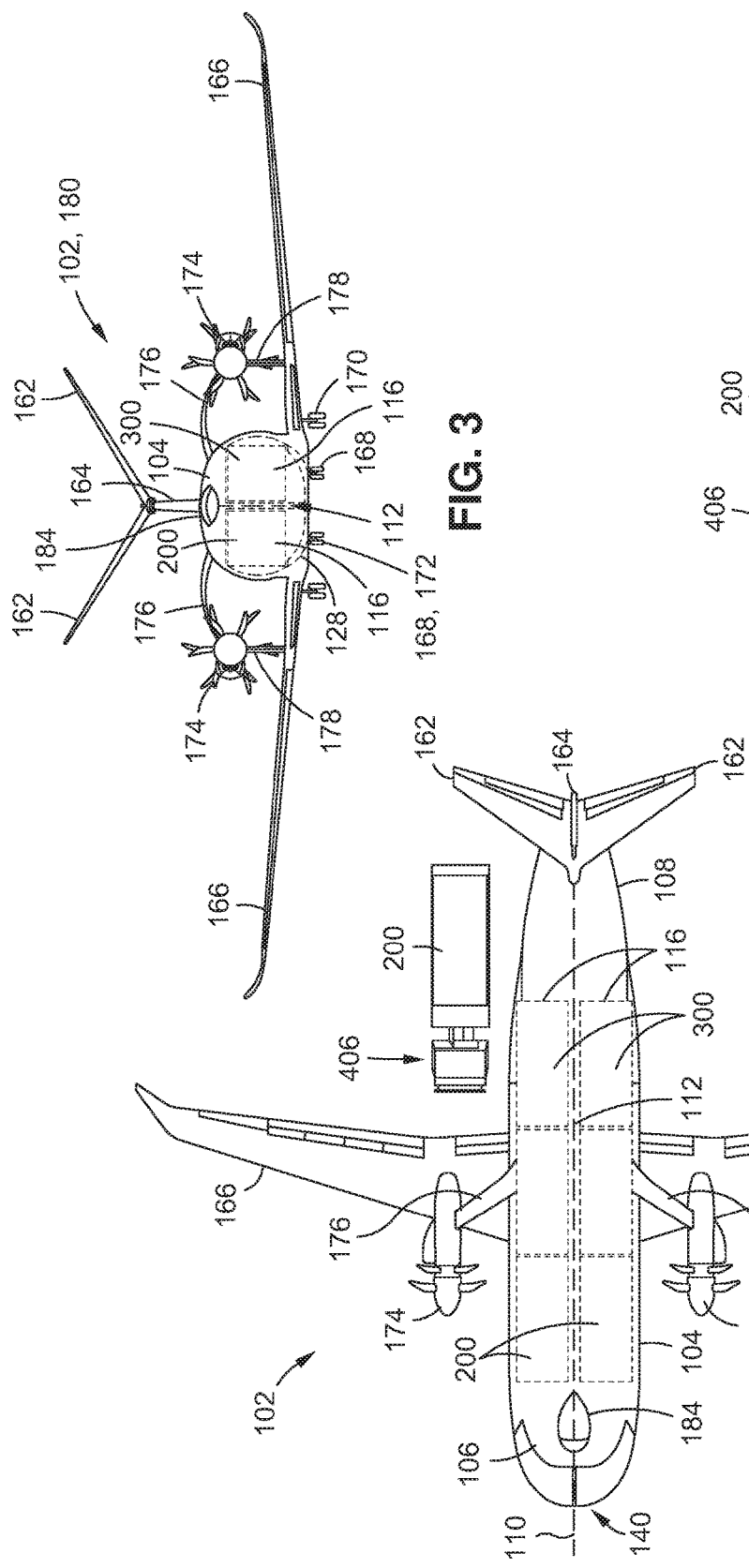
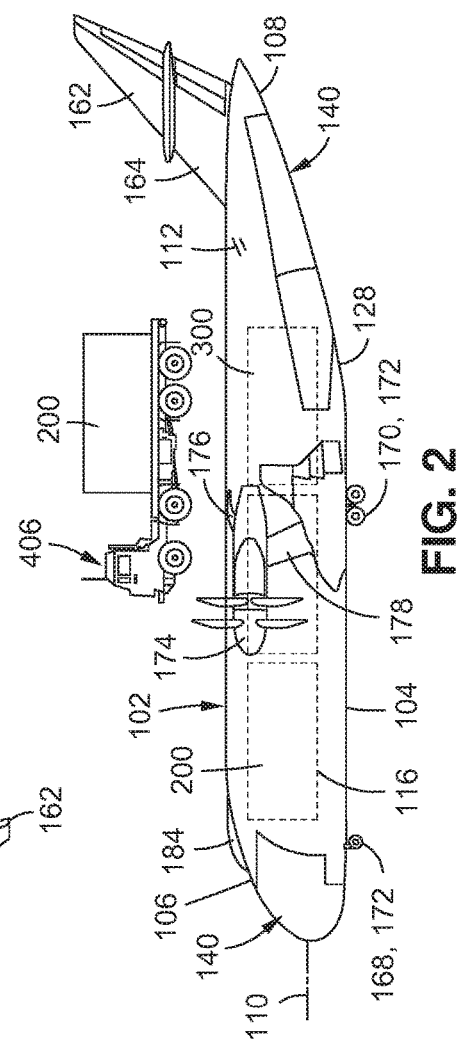
FIG. 1
FIG. 2
FIG. 3

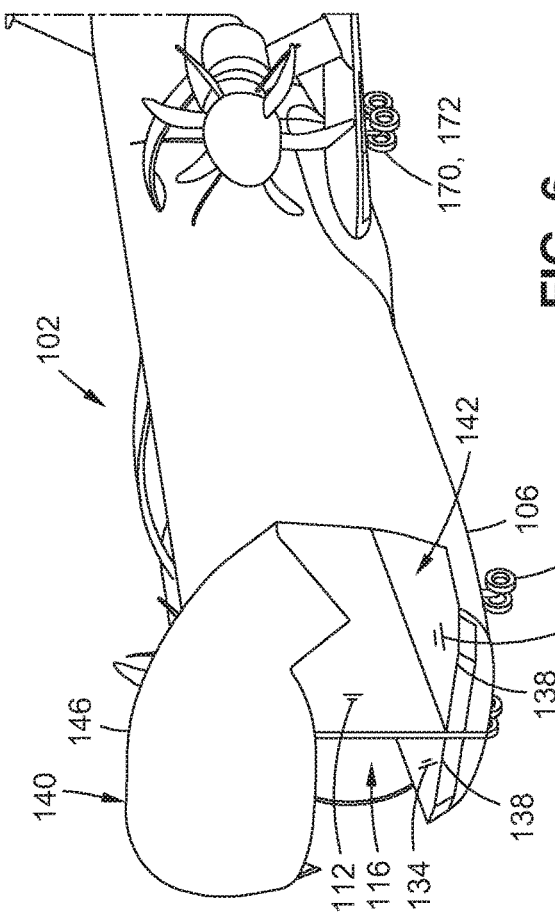
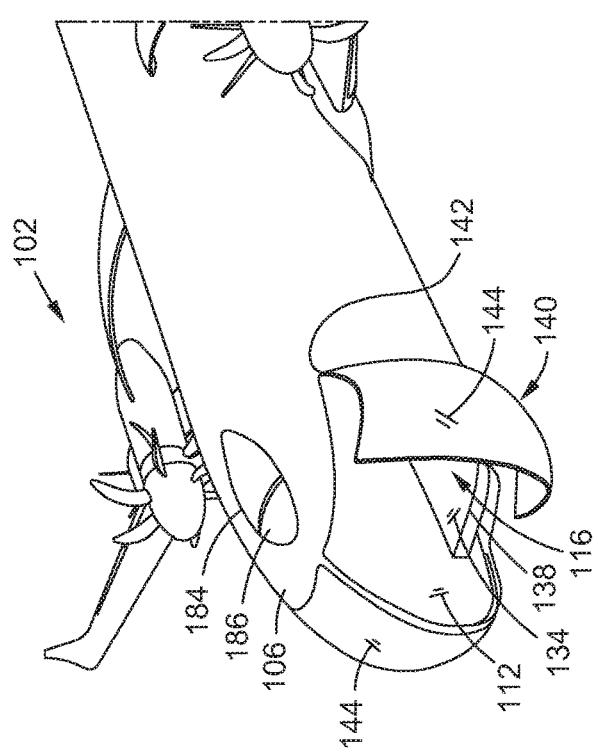
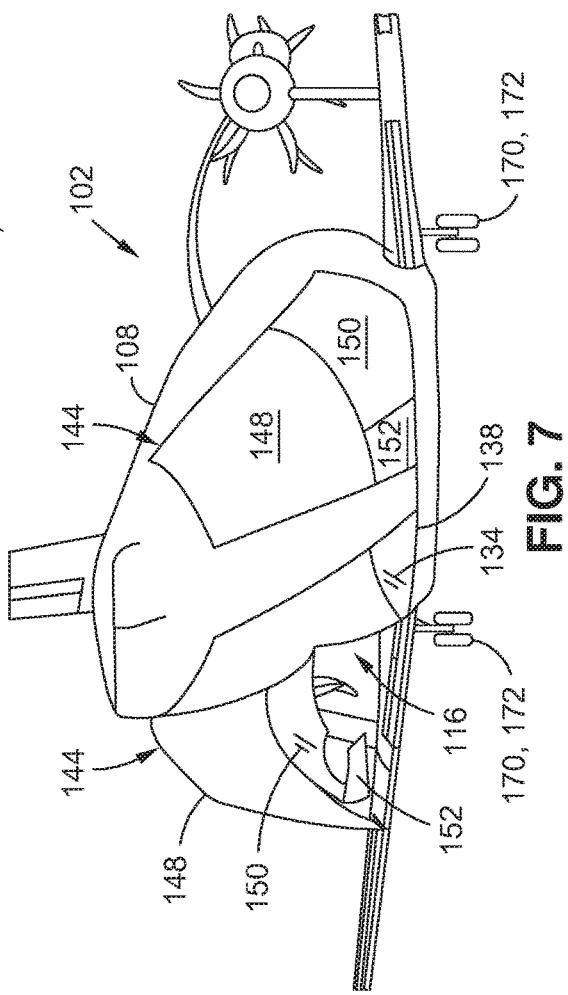

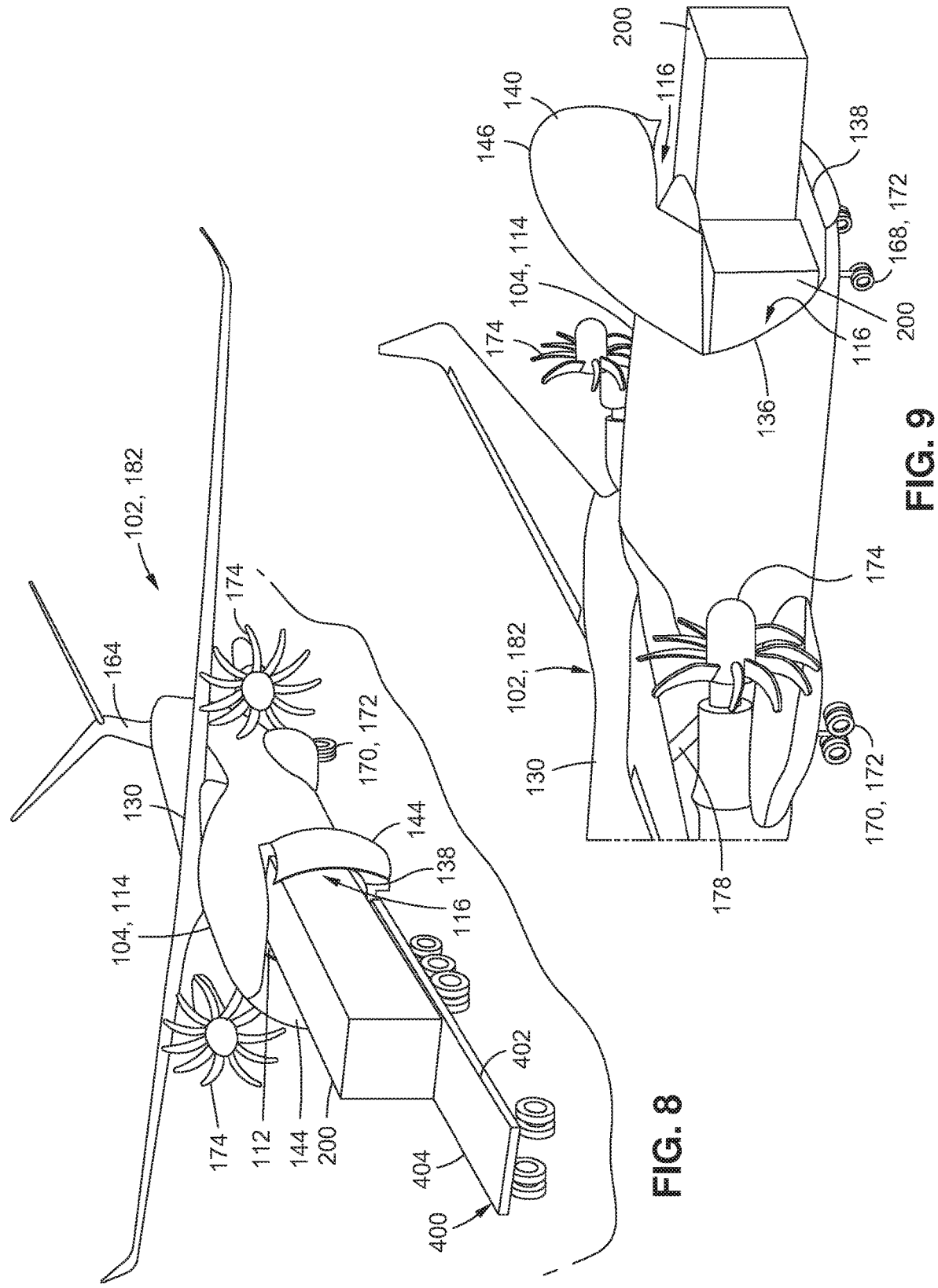

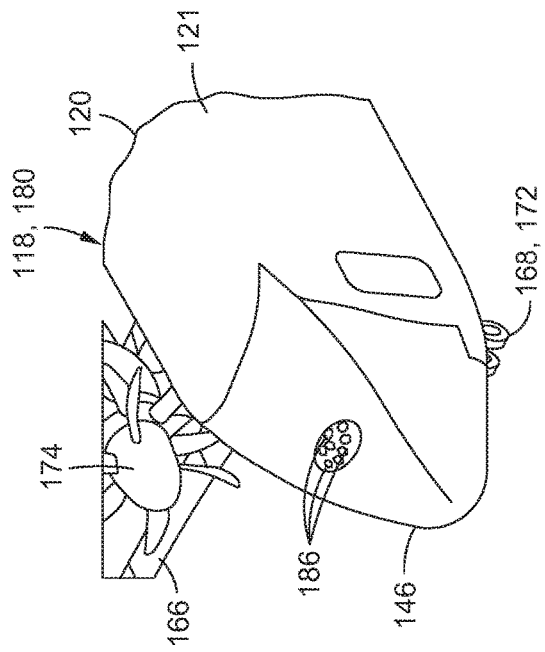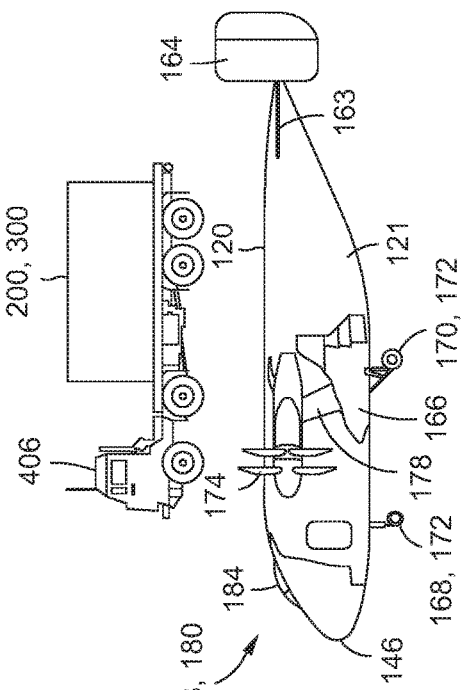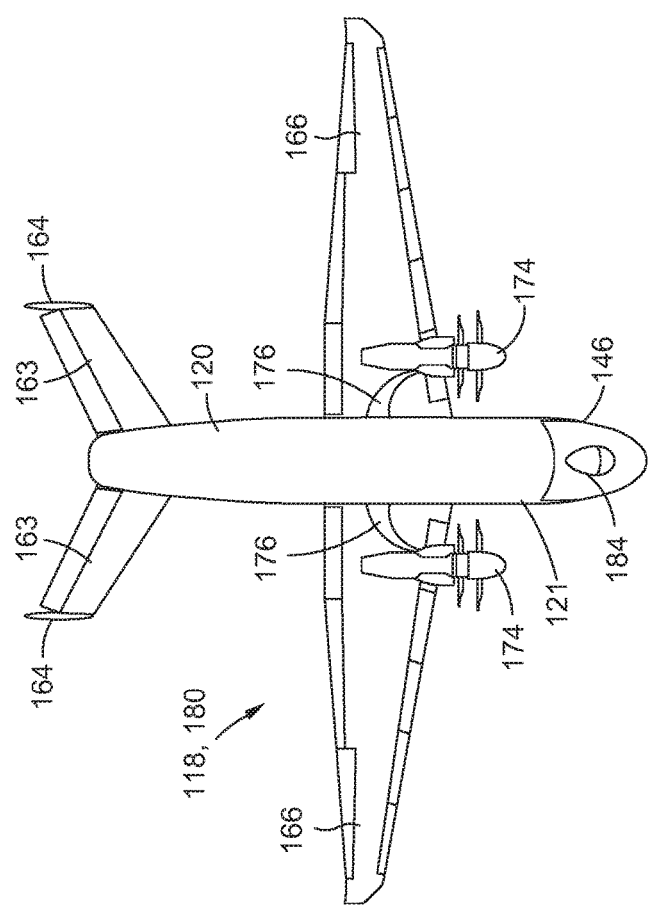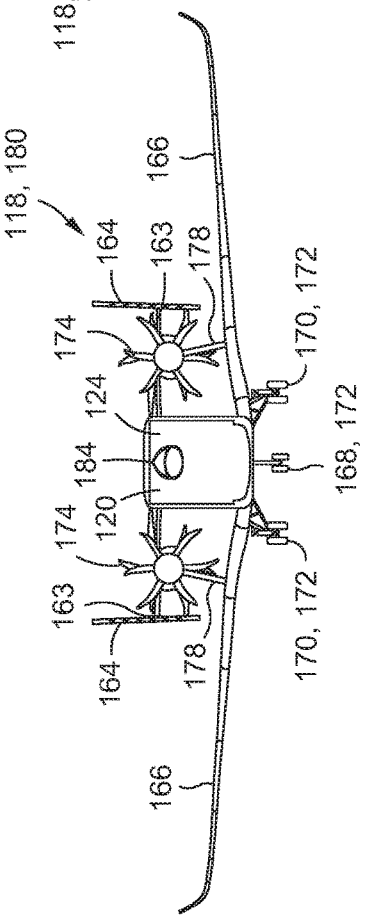

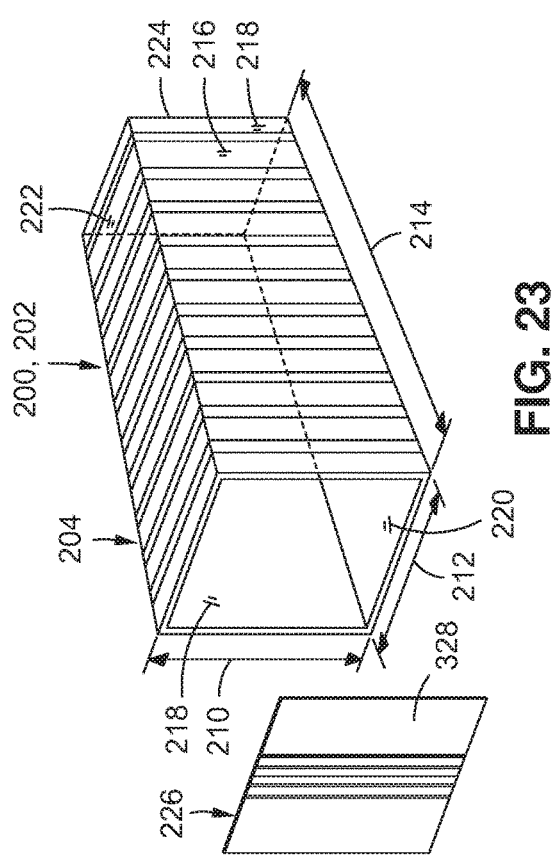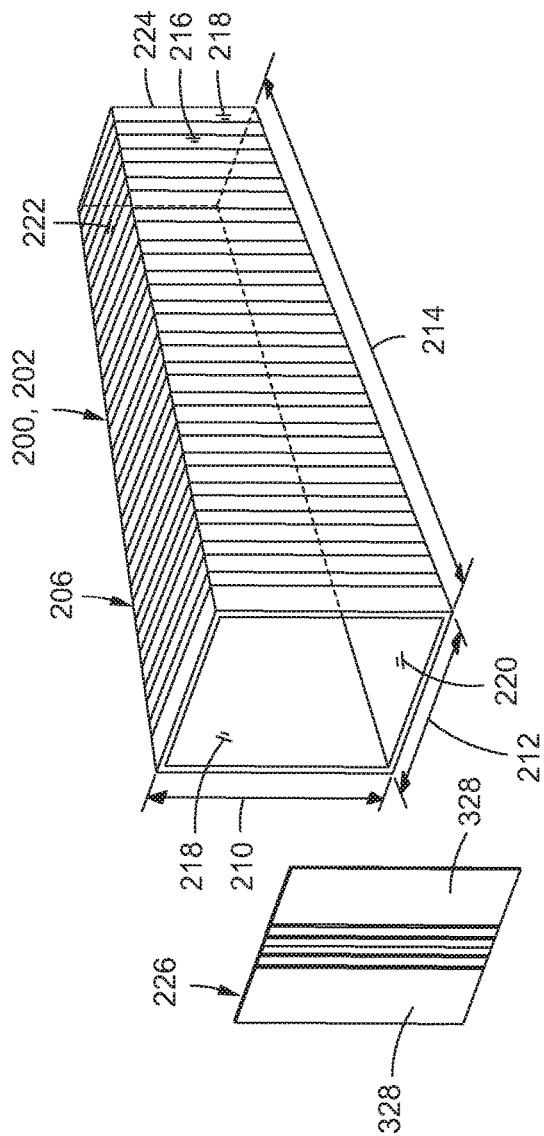

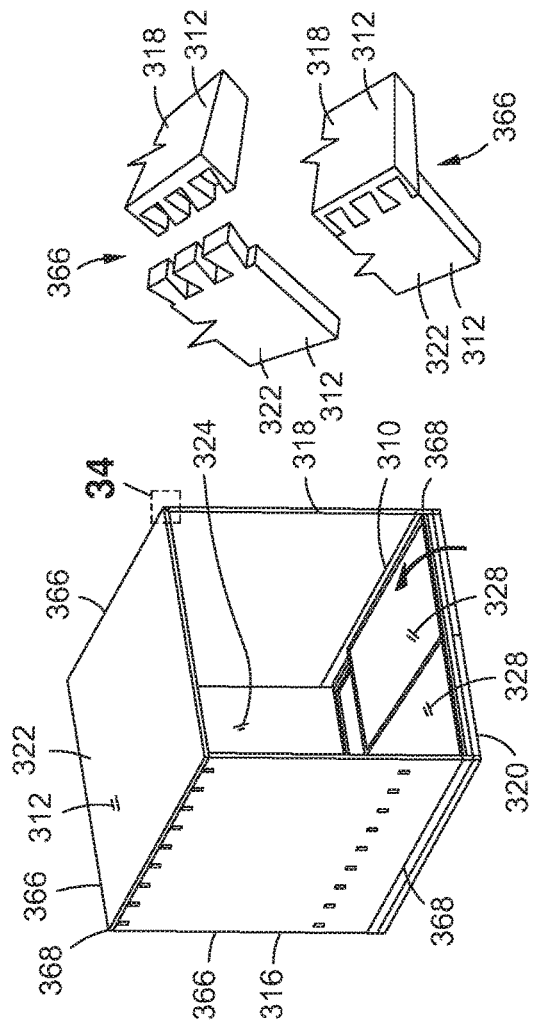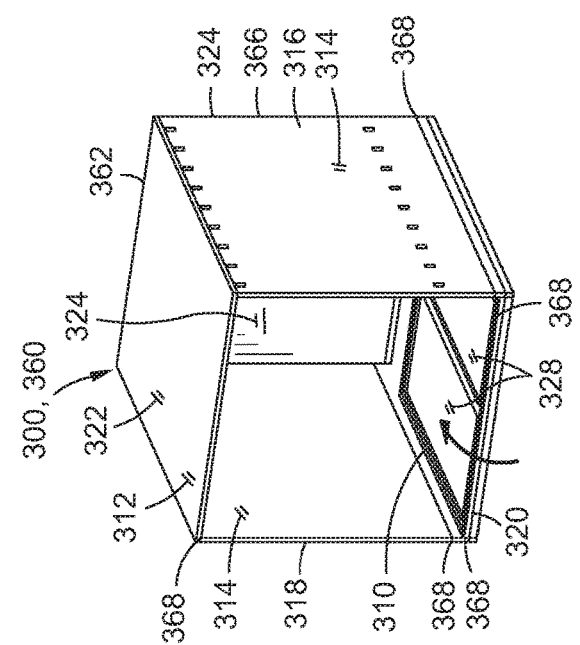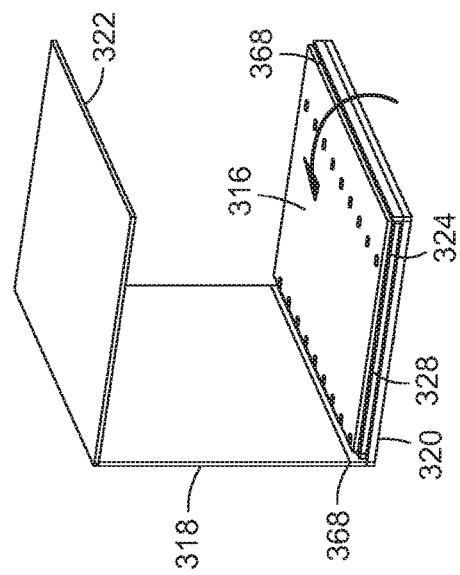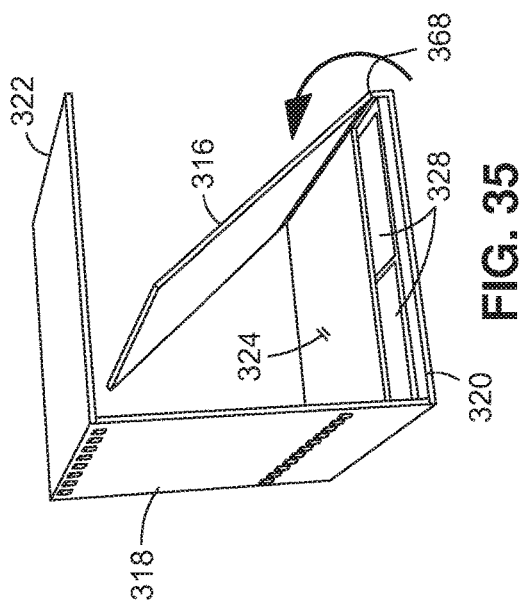

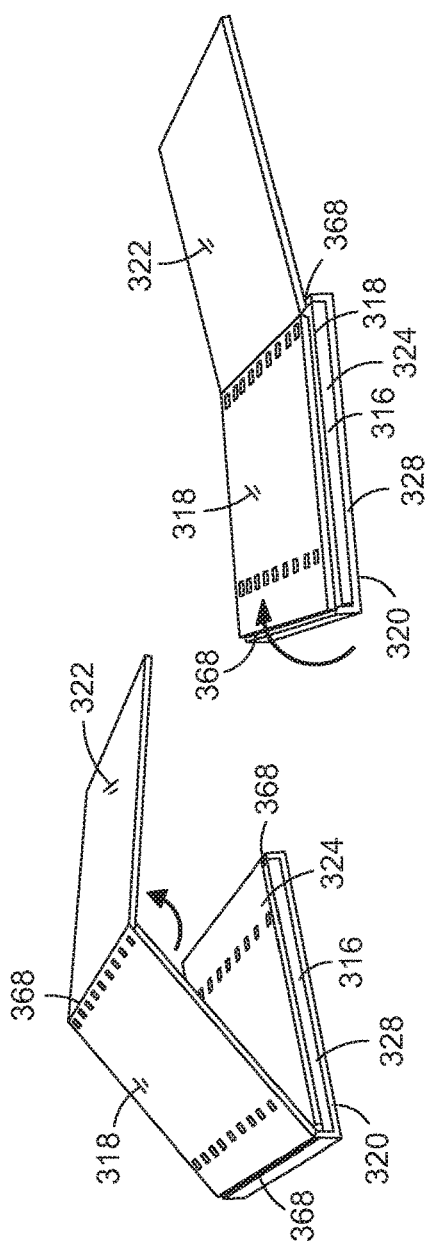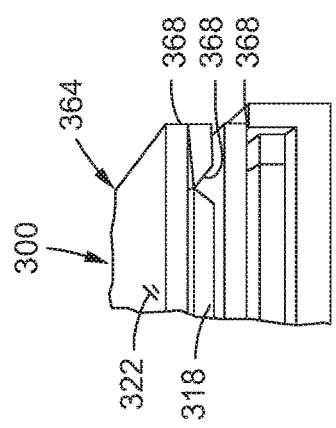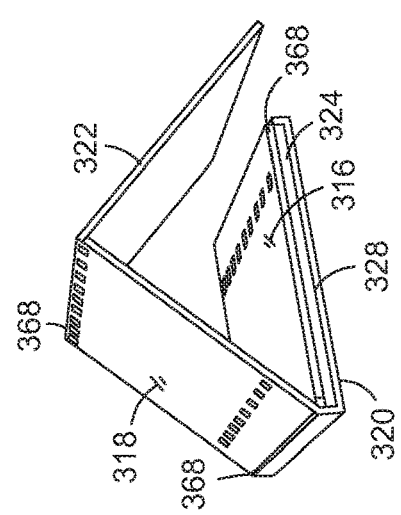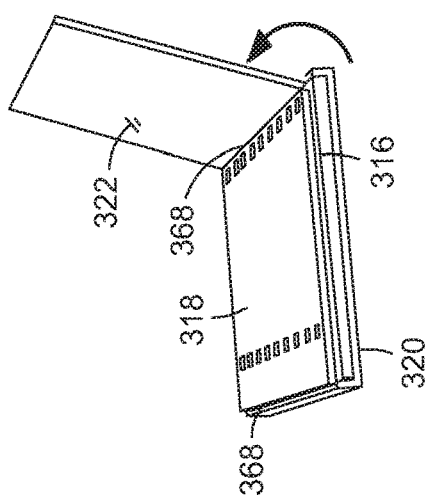
FIG. 37  FIG. 38  FIG. 39  FIG. 40  FIG. 41  FIG. 42

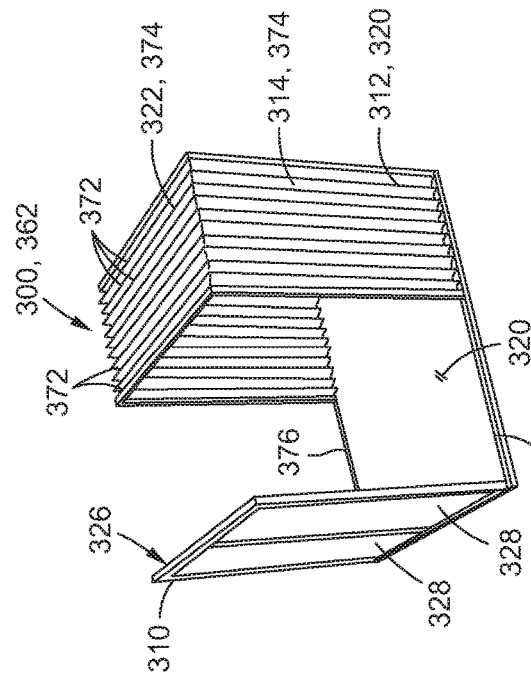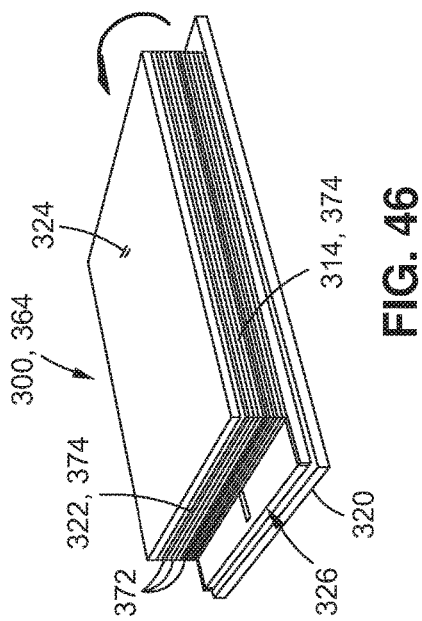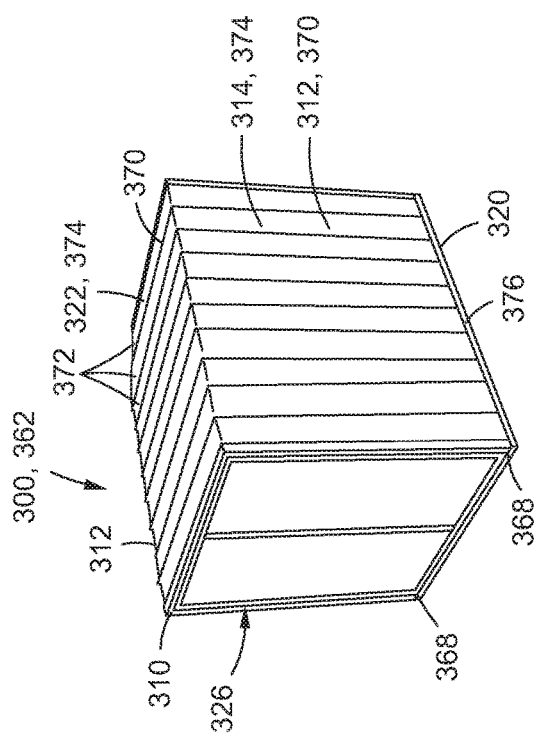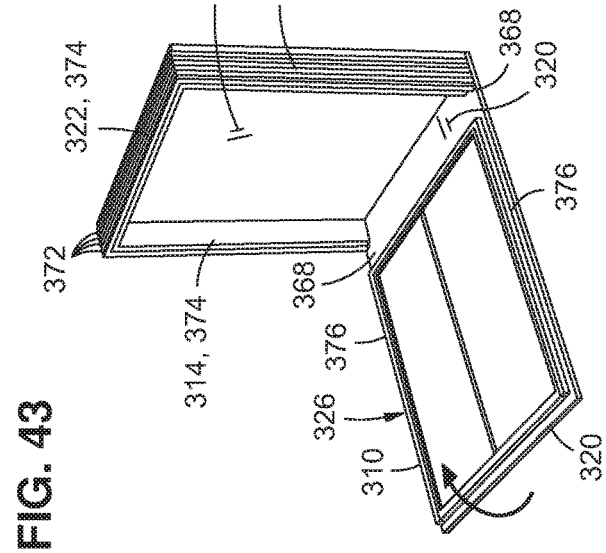

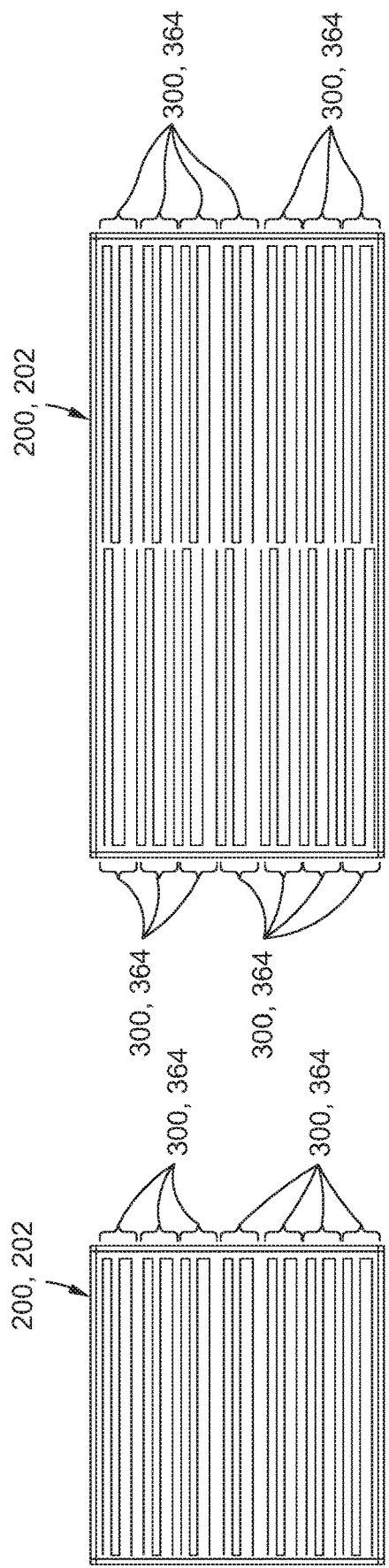
FIG. 47
FIG. 48
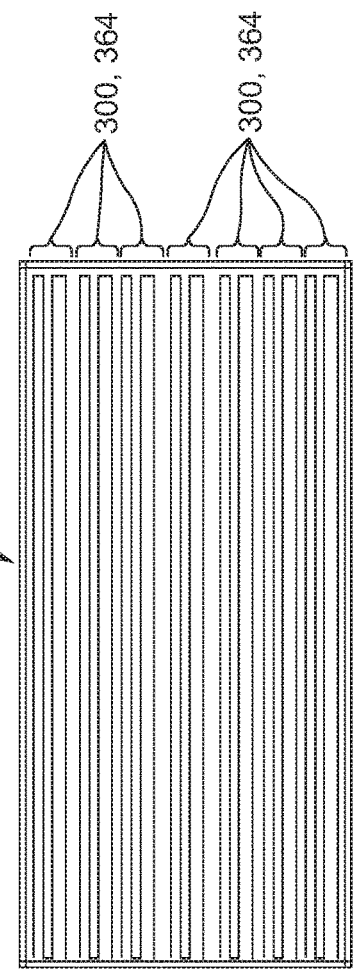
FIG. 49

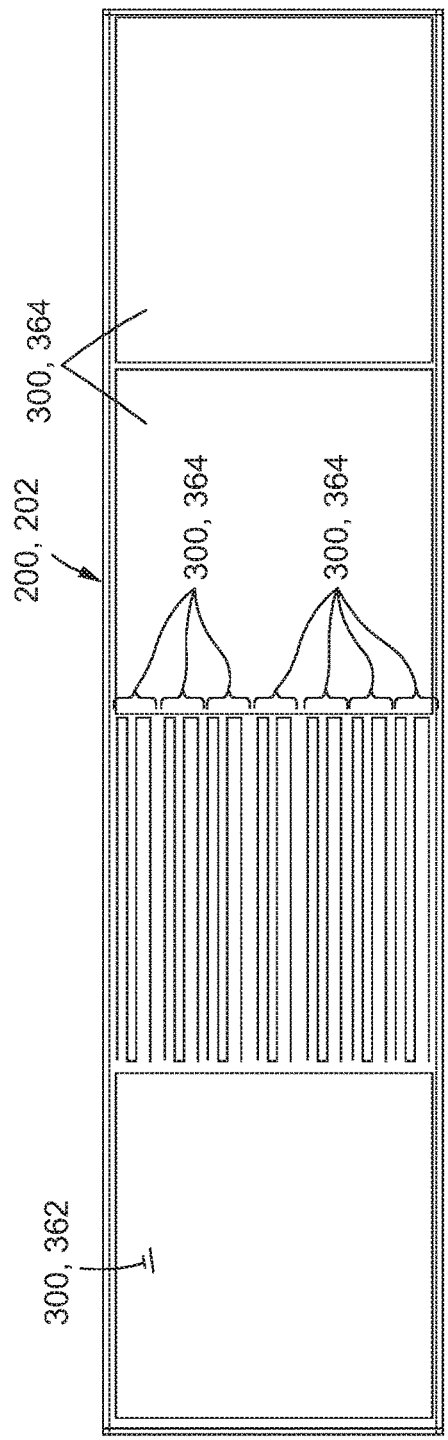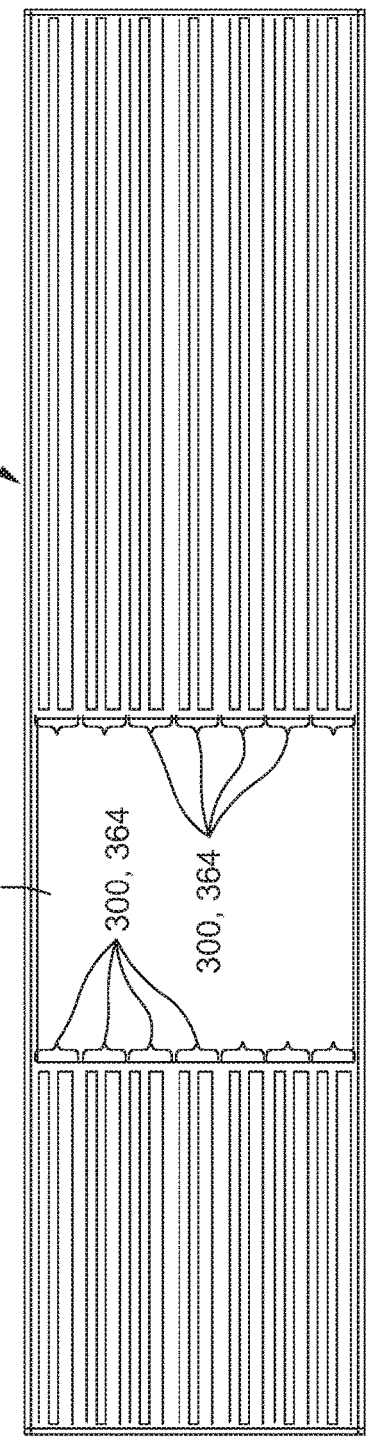

FREIGHTER AIRCRAFT SYSTEM AND CONTAINER SYSTEM

FIELD

The present disclosure relates generally to freighter aircraft and, more particularly, to a freighter aircraft system configured for carrying standardized-geometry intermodal shipping containers and container inserts of a container system in which the container insert is configured to be inserted into the standardized-geometry intermodal shipping container.

BACKGROUND

Intermodal shipping containers are box-like containers commonly used for the global transport of freight by surface modes including sea (e.g., container ship), rail (e.g., flatbed rail car), and road (e.g., semi-truck pulling flatbed trailer). Certain types of freight such as freight having a short delivery time requirement may be transported by aircraft. Unfortunately, due to the high tare weight of intermodal shipping containers, air transport of freight requires re-bulking operations in which the freight is removed from intermodal shipping containers and is transferred to cargo pallets or cargo containers specifically configured to be carried in conventional aircraft. Once the aircraft reaches its destination airport, the cargo pallets and cargo containers are removed from the aircraft and re-bulking operations are again performed to transfer the freight back into intermodal shipping containers for surface transport (e.g., train or truck) of the freight to its final destination.

As may be appreciated, re-bulking operations are time-consuming and costly. In addition, customs clearance of re-bulked freight may be more complex and time-consuming than for freight that crosses borders via intermodal container. Furthermore, transferring freight between intermodal containers and cargo pallets or cargo containers subjects the freight to the risk of damage or loss during handling or customs clearance.

As can be seen, there exists a need in the art for a system and method for the seamless transport of freight which avoids the time and expense associated with re-bulking operations between air transport and surface transport modes.

SUMMARY

The above-noted needs associated with transporting freight are specifically addressed by the present disclosure which provides a trunk route aircraft having at least one wing for supporting the aircraft during flight, and at least one propulsor for forward propulsion of the aircraft. The trunk route aircraft further includes a pressurized trunk route fuselage having a double-bubble cross-sectional shape and a generally vertically-oriented longitudinal bulkhead dividing the trunk route fuselage interior into two side-by-side trunk route payload compartments. The longitudinal bulkhead is loaded in tension when the trunk route fuselage is pressurized. The trunk route payload compartments are each configured to receive a plurality of ISO (International Organization for Standardization) geometry containers arranged end-to-end, or a plurality of container inserts arranged end-to-end, each container insert also configured to be received within the ISO-geometry container, or a combination of one or more ISO-geometry containers and one or more container inserts arranged end-to-end.

Also disclosed is a freighter aircraft system having a feeder route aircraft having a feeder route fuselage having a feeder route payload compartment configured to receive one of the following: a single approximately-20-foot-long lightweight ISO-geometry container or two approximately-10-foot-long lightweight ISO-geometry containers arranged end-to-end, or a single approximately-20-foot-long container insert or two approximately-10-foot-long container inserts arranged end-to-end and configured to be received within an approximately-20-foot-long lightweight ISO-geometry container. The freighter aircraft system further includes a trunk route aircraft as described above. The feeder route aircraft and the trunk route aircraft each have at least one wing for supporting the aircraft during flight, and at least one propulsor for forward propulsion of the aircraft.

In addition, disclosed is a container system having a container insert configured to be received within an ISO-geometry container having a container door and a door opening on at least one of opposing container ends. The container insert has insert external dimensions including an insert external height compatible with the container door opening height, and an insert external width compatible with the container door opening width.

Also disclosed is a method of transporting freight comprising transferring a lightweight ISO-geometry container or a container insert between a feeder route payload compartment of a feeder route aircraft and a trunk route payload compartment of a trunk route aircraft. The container insert is configured to be received within the lightweight ISO-geometry container.

A further method of transferring freight includes transferring a container insert onto or off of a vehicle comprising at least one of a ship, a train, a truck, and an aircraft. The container insert configured to be received within a lightweight ISO-geometry container.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a top view of an example of a trunk route aircraft which is a first member of a two-member freighter aircraft system disclosed herein;

FIG. 2 is a side view of the trunk route aircraft of FIG. 1;

FIG. 3 is a front view of the trunk route aircraft of FIG. 1;

FIG. 5 is a perspective view of a forward portion of an example of a trunk route aircraft having hinged left-opening and right-opening cargo doors for access to the side-by-side trunk route payload compartments;

FIG. 6 is a perspective view of a forward portion of a further example of a trunk route aircraft having a hinged upward-opening cargo door;

FIG. 7 is a perspective view of an aft portion of an example of a trunk route aircraft having hinged left-opening and right-opening cargo doors;

FIG. 8 is a perspective view of an example of a trunk route aircraft during the transferring of a lightweight ISO-geometry container or container insert from a flatbed trailer through the fuselage forward end of the trunk route fuselage and into one of the trunk route payload compartments;

FIG. 9 is a perspective view of the trunk route aircraft illustrating a lightweight ISO-geometry container or container insert during loading into each one of the trunk route payload compartments;

FIG. 12 is a top view of an example of a feeder route aircraft which is a second member of the two-member freighter aircraft system disclosed herein and which includes the trunk route aircraft shown in FIGS. 1-11;

FIG. 13 is a side view of the feeder route aircraft of FIG. 12;

FIG. 14 is a side view of the feeder route aircraft of FIG. 12;

FIG. 15 is a perspective view of a forward portion of an example of a feeder route aircraft having multiple cameras mounted on the fuselage forward end of the feeder route fuselage for autonomous and/or remotely-controlled piloting of the feeder route aircraft;

FIG. 23 is a partially-exploded perspective view of an example of an 20-foot-long standard-height version of an ISO-geometry container;

FIG. 24 is a partially-exploded perspective view of an example of an 40-foot-long high-cube version of an ISO-geometry container;

FIG. 32 is a perspective view of an example of a container insert in a foldable configuration and showing a slab door folded downwardly onto the insert floor during a first step of folding the container insert into a folded state;

FIG. 33 shows an insert end wall folded down onto the slab door during a second step of folding the container insert into a folded state;

FIG. 34 is a magnified view of a portion of the container insert identified by reference numeral 34 of FIG. 33 and illustrating an example of an edge joining mechanism for removably connecting the insert roof to a first insert side wall;

FIG. 35 shows the first insert side wall being folded downwardly toward the insert end wall during a third step of folding the container insert into a folded state;

FIG. 36 shows the first insert side wall lying flat against the insert end wall;

FIG. 37 shows a second insert side wall being folded downwardly onto the first insert side wall during a fourth step of folding the container insert into a folded state;

FIG. 38 shows the insert roof being folded upwardly while the second insert side wall is folded downwardly;

FIG. 39 shows the second insert side wall lying flat against the first insert side wall;

FIG. 40 shows the continued folding of the insert roof over toward the second insert side wall;

FIG. 41 shows the insert roof lying flat against the second insert side wall;

FIG. 42 is a magnified view of a portion of the container insert in the folded state and showing the hinge members that interconnect the insert panels;

FIG. 43 is a perspective view of a further example of a container insert in which at least some of the insert panels have an accordion-style configuration to allowed transition of the container insert from an erected state to a folded state;

FIG. 44 shows the insert side walls and the insert roof being collapsed in an accordion-style manner;

FIG. 45 shows the slab door folded down onto the insert floor;

FIG. 46 shows the insert end wall, the insert side walls and insert roof folded over onto the slab door when the container insert is in the folded state;

FIG. 47 is a side schematic view of an example of a 10-foot-long ISO-geometry container containing a stack of 10-foot-long container inserts each in a folded state;

FIG. 48 is a side schematic view of an example of a 20-foot-long ISO-geometry container containing two stacks of 10-foot-long container inserts each in a folded state;

FIG. 49 is a side schematic view of an example of a 20-foot-long ISO-geometry container containing a stack of 20-foot-long container inserts each in a folded state;

FIG. 50 is a side schematic view of an example of a 40-foot-long ISO-geometry container containing three 10-foot-long container inserts each in an erected state, and further containing a stack of 10-foot-long container inserts each in a folded state;

FIG. 51 is a side schematic view of an example of a 40-foot-long ISO-geometry container containing one 10-foot-long container insert each in an erected state, a stack of 10-foot-long container inserts each in a folded state, and a stack of 20-foot-long container inserts each in a folded state;

DETAILED DESCRIPTION

Figure 4:
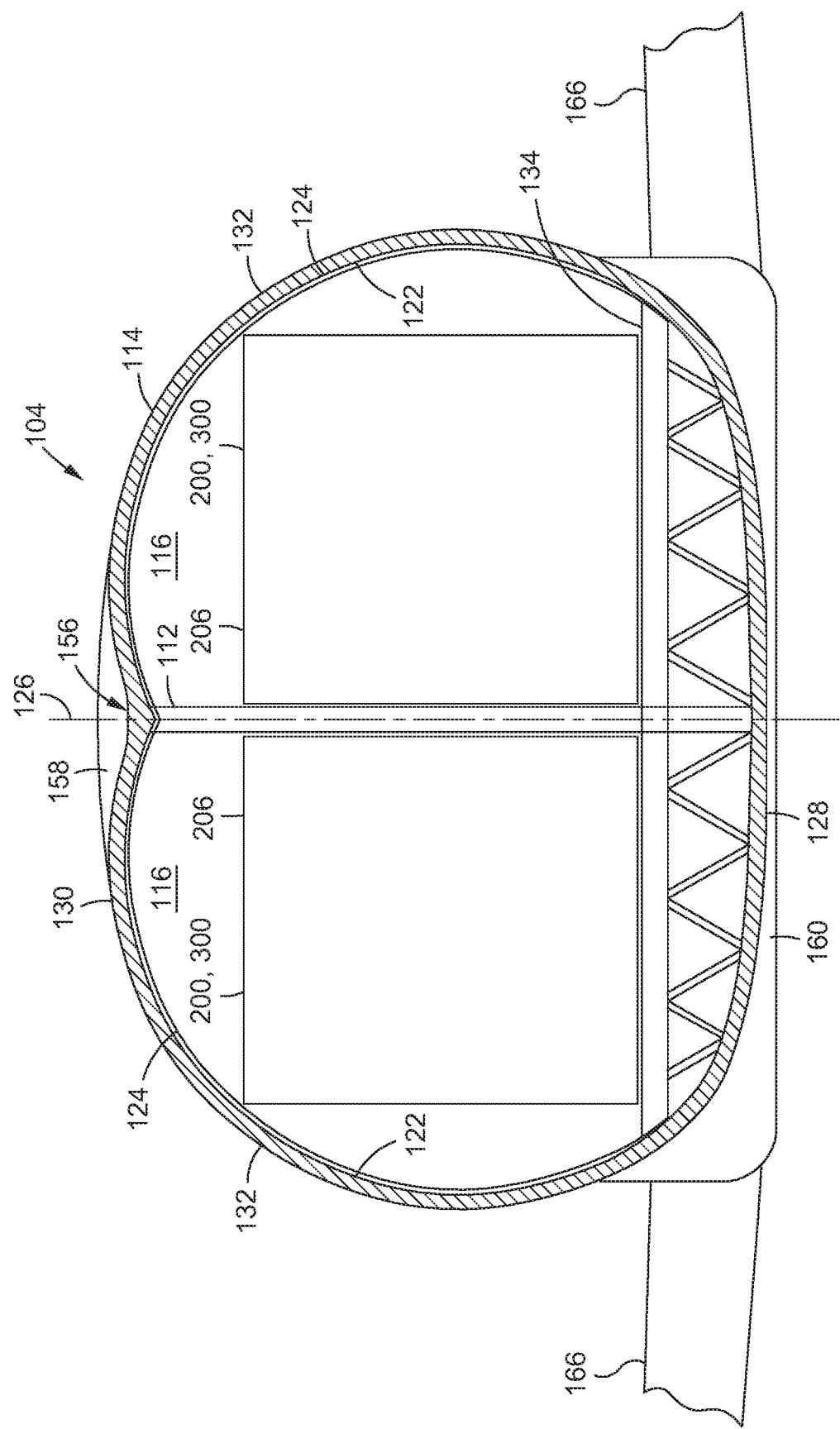
FIG. 4 is a sectional view of an example of a trunk route fuselage of the trunk route aircraft of FIG. 1 and illustrating a horizontally-oriented double-bubble cross-sectional shape and having a generally vertically-oriented longitudinal bulkhead dividing the trunk route fuselage interior into two side-by-side trunk route payload compartments each containing one or more ISO (International Organization for Standardization) geometry containers arranged in end-to-end relation with each other as shown in FIG. 2.

Referring now to the drawings which illustrate preferred and various examples of the disclosure, shown in FIG. 1 is a top view of an example of a trunk route aircraft 102 which may be described as a long-haul or long-range freighter aircraft sized and configured for carrying multiple lightweight ISO-geometry containers 200 and/or multiple container inserts 300 on transcontinental missions and/or transoceanic missions. In the present disclosure, ISO-geometry containers are orthogonally-shaped box-type containers manufactured according to specifications defined by the International Organization for Standardization (ISO). The document published by the ISO and entitled "ISO 668: Series 1 freight containers—Classification, dimensions and ratings," referred to herein as ISO 668 and incorporated by reference in its entirety herein, defines the dimensions of ISO-geometry containers as used herein.

Figure 22:
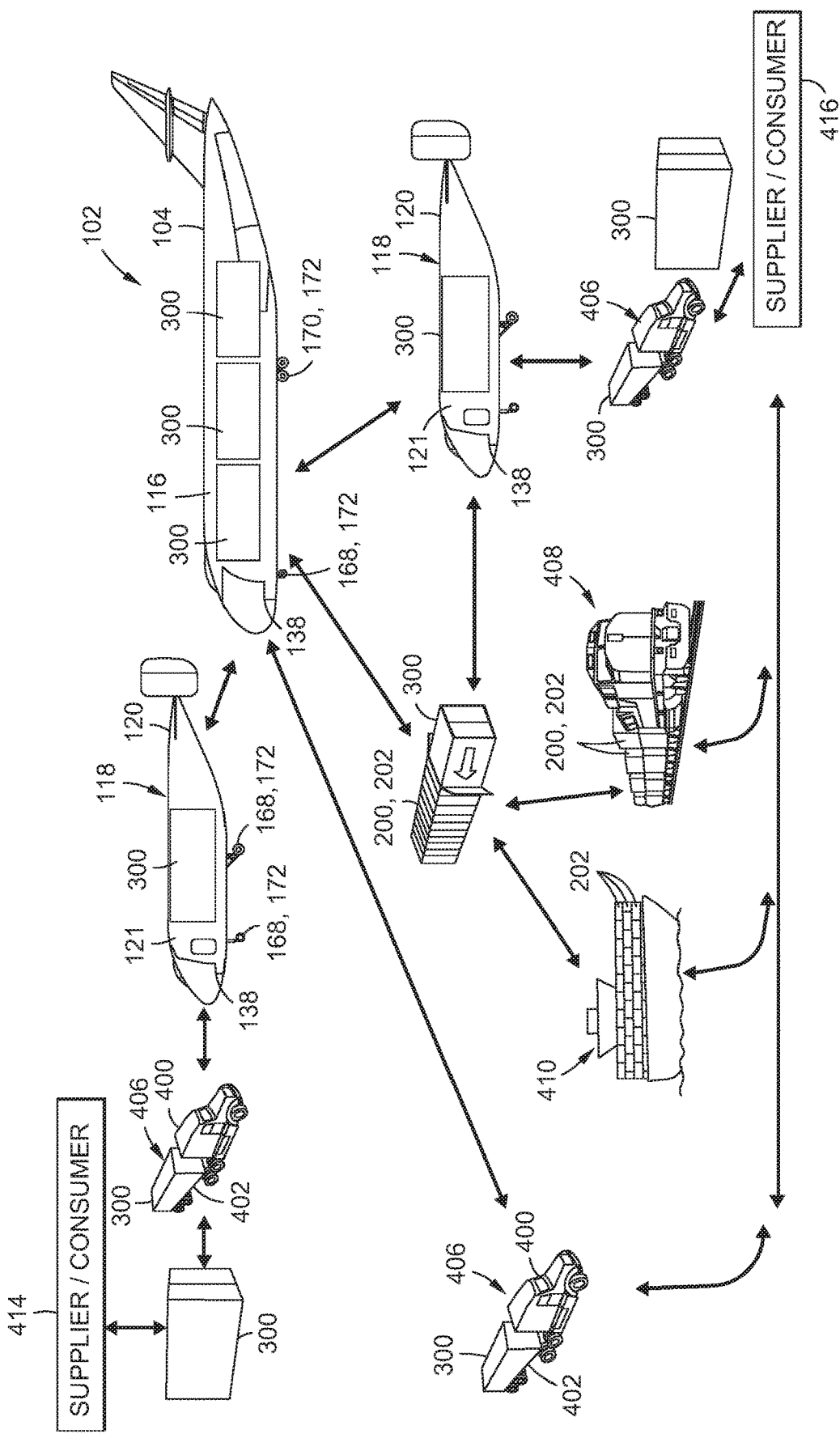
FIG. 22 is a schematic view of a freight delivery network for transporting freight using ISO-geometry containers and container inserts with the presently-disclosed two-member freighter aircraft system in conjunction with traditional surface transportation modes of ship, rail, and truck without the need for re-bulking operations when transferring to or from the aircraft of the two-member freighter aircraft system.

In the present disclosure, ISO-geometry containers may be standard-weight ISO-geometry containers 202 (FIG. 23) or lightweight ISO-geometry containers 200 (FIG. 22). ISO-geometry containers 200, 202 and/or container inserts 300 may include standardized corner fittings on each of the eight (8) corners. Such corner fittings are referred to in the document ISO 668. The corner fittings allow the ISO-geometry containers 200, 202 to be lifted (e.g., via crane) and secured to a vehicle (e.g., FIG. 22—a flatbed trailer 402, a container ship 410, etc.) and secured to each other when stacked. Standard-weight ISO-geometry containers 202 are typically comprised of corrugated steel panels coupled to a steel frame. Lightweight ISO-geometry containers 200 have the same size and shape as standard-weight ISO-geometry containers 202, but are comprised of lighter weight materials such as aluminum panels, composite panels, or sandwich panels coupled to a steel frame. Standard-weight ISO-geometry containers 202 are used predominantly in surface modes of freight transportation including truck 406, train 408, and ship 410, due to the ability to stack up to ten (10) standard-weight ISO-geometry containers 202 on top of each other as may be required when loaded onto a container ship 410. Lightweight ISO-geometry containers 200 are at least 50 percent of the weight of a standard-weight ISO-geometry container 202 and are limited to stacking up to three (3) on top of each other. Container inserts 300 (e.g., FIG. 25-28) are also disclosed herein and are sized complementary to ISO-geometry containers 200, 202 and are specifically configured to be inserted into ISO-geometry containers 200, 202, as described below.

FIG. 2 is a side view of the presently-disclosed trunk route aircraft 102, and FIG. 3 is a front view of the trunk route aircraft 102 which includes a trunk route fuselage 104 supported on landing gear such as a main landing gear 170 and a nose landing gear 168 as described below. The trunk route fuselage 104 has one or more cargo doors 140 in the fuselage forward end 106 and/or in the fuselage aft end 108. In addition, the trunk route fuselage 104 includes side-by-side trunk route payload compartments 116 separated by a longitudinal bulkhead 112 as described below. Each one of the trunk route payload compartments 116 is sized and configured to receive a plurality of lightweight ISO-geometry containers 200 arranged end-to-end, or a plurality of container inserts 300 arranged end-to-end, or a combination of one or more lightweight ISO-geometry containers 200 and one or more container inserts 300 arranged end-to-end, as described below. The lightweight ISO-geometry containers 200 and/or container inserts 300 may be loaded into the trunk route payload compartments 116 via the cargo doors 140 in the fuselage forward end 106 and/or fuselage aft end 108.

In the present disclosure, ISO-geometry containers (i.e., standard-weight versions and lightweight versions) have a container external width 212 (FIGS. 23-24) of approximately 8 feet. Also in the present disclosure, ISO-geometry containers (i.e., standard-weight and lightweight) are available in two different container external heights 210 including as a standard-height version 204 (FIG. 23) of an ISO-geometry container which has a height of approximately 8 feet 6 inches, and as a high-cube version 206 (FIG. 24) of an ISO-geometry container which has a height of approximately 9 feet 6 inches. ISO-geometry containers (i.e., standard-weight and lightweight) are available in a variety of different container external lengths 214 ranging from 10 feet to 56 feet with the most common lengths being 10 feet, 20 feet and 40 feet.

FIG. 1-3 show an example of six 20-foot-long lightweight ISO-geometry containers 200 loaded into the trunk route fuselage 104. To provide a sense of scale, FIGS. 1-2 show an example of a flatbed truck 406 carrying a 20-foot-long lightweight ISO-geometry container 200 located next to the trunk route aircraft 102. FIG. 3 shows each trunk route payload compartment 116 containing three lightweight ISO-geometry containers 200 arranged end-to-end. As may be appreciated, a trunk route payload compartment 116 is sized to be loaded with any one or more of a variety of different lengths of lightweight ISO-geometry containers 200 and/or container inserts 300. For example, a trunk route payload compartment 116 may contain one 40-foot-long lightweight ISO-geometry container 200 or 40-foot-long container insert 300, and one 20-foot-long lightweight ISO-geometry container 200 or 20-foot-long container insert 300. In another example not shown, a trunk route payload compartment 116 may contain four 10-foot-long lightweight ISO-geometry containers 200 and/or four 10-foot-long container inserts 300, and one 20-foot-long lightweight ISO-geometry container 200 or 20-foot-long container insert 300. Although not shown in FIGS. 1-3, additional smaller cargo pallets 380 or cargo containers 378 (e.g., FIG. 11) may be loaded into a trunk route payload compartment 116 and placed on opposite ends of one relatively long lightweight ISO-geometry container 200 or container insert 300, or on opposite ends of a series of lightweight ISO-geometry containers 200 or container inserts 300, as described below.

Referring still to FIGS. 1-3, the aft region of the trunk route aircraft 102 has an empennage including a vertical stabilizer 164 and two tail surfaces 162 forming a V-tail or Y-tail configuration. However, the empennage may be provided in alternative configurations such as a T-tail configuration (not shown) having a pair of tail surfaces (e.g., horizontal stabilizers) mounted on top of a vertical stabilizer 164, or the empennage may be provided in a cruciform configuration (not shown). A V-tail configuration or a T-tail configuration may avoid direct impingement of thrust from the aircraft propulsors 174 onto the empennage. In addition, a V-tail configuration or a T-tail configuration may be favorably integrated into the fuselage aft end 108 of the trunk route aircraft 102 which, as mentioned above, may include cargo doors 140 for loading lightweight ISO-geometry containers 200 and/or container inserts 300 into the trunk route payload compartments 116.

Referring to FIGS. 1-4, the trunk route aircraft 102 includes a pair of wings 166 for supporting the trunk route aircraft 102 during flight. In the example shown, the trunk route aircraft 102 has a low-wing configuration 180 having aftwardly swept wings 166 that extend outwardly from a fuselage lower portion 128 of the trunk route fuselage 104. The trunk route fuselage 104 includes a wing-to-body joint 160 (FIG. 4) having a wing box structure located below the cargo supporting floor 134 and from which the wings 166 extend (FIG. 4). However, in other examples described below, the trunk route aircraft 102 may be provided in a high-wing configuration 182 (e.g., FIGS. 8-11) in which the wings 166 extend outwardly from the fuselage upper portion 130 of the trunk route fuselage 104.

In FIGS. 1-3, the trunk route aircraft 102 is shown having a pair of propulsors 174 although the trunk route aircraft 102 may be provided with any number of propulsors 174. In the example shown, the propulsors 174 are mounted above or over the wings 166. Each one of the propulsors 174 may be vertically supported on a pylon 178 and laterally supported by an overwing bridge 176 extending between the trunk route fuselage 104 and the propulsor 174. However, the trunk route aircraft 102 may include propulsors 174 mounted in any one of a variety of alternative configurations. For example, for the high-wing configuration 182 shown in FIGS. 8-11 and described below, each propulsor 174 is supported by a pylon 178 extending downwardly from a wing 166. Although the figures show the propulsors 174 as turboprop propulsors (e.g., a turbine engine driving counter-rotating propellers), the propulsors 174 may be provided in alternative configurations including, but not limited to, a turbofan configuration (not shown) such as a high-bypass-ratio turbofan, a turbofan having an augmenter fan or variable pitch fan, a hybrid propulsor having an electrically driven augmenter fan, or other propulsor configurations.

Referring to FIGS. 1-4, the trunk route fuselage 104 has a fuselage forward end 106, a fuselage aft end 108, and a longitudinal axis 110. In addition, the trunk route fuselage 104 is pressurized. For example, the trunk route fuselage 104 may be capable of maintaining internal pressure equivalent to the atmospheric pressure at 8,000 feet (e.g., above sea level) for an extended period of time. However, the trunk route fuselage 104 may be capable of internal pressurization equivalent to the atmospheric pressure at lower altitudes (e.g., at 6,000 feet above sea level). The trunk route aircraft 102 may have a cockpit 184 located at the fuselage forward end 106 and configured for a standard dual-pilot crew (e.g., a pilot and a co-pilot). Alternatively, the trunk route aircraft 102 may include a cockpit 184 configured for a reduced flight crew (e.g., a single pilot) and may optionally include one or more forward-looking cameras (not shown), as described below. In some examples, the trunk route aircraft 102 may be operated autonomously (e.g., without human intervention) as described below.

Referring to FIG. 4, the trunk route fuselage 104 has a horizontally-oriented double-bubble cross-sectional shape 114. The double-bubble cross-sectional shape 114 is defined by opposing (e.g., left-hand and right-hand) fuselage body portions 132 each having a rounded cross-sectional shape. The double-bubble cross-sectional shape 114 has a fuselage lower portion 128 and a fuselage upper portion 130. The fuselage lower portion 128 may be slightly rounded, and the fuselage upper portion 130 may have a shallow V-shaped notch 156. The trunk route fuselage 104 may include a crown fairing 158 extending lengthwise along the V-shaped notch 156 to provide an aerodynamically smooth continuation of the curvature of the opposing fuselage body portions 132.

Referring still to FIG. 4, the trunk route fuselage 104 has a generally vertically-oriented longitudinal bulkhead 112 as mentioned above that extends along a length of the trunk route fuselage 104 and interconnects the fuselage upper portion 130 with the fuselage lower portion 128. The longitudinal bulkhead 112 may be coincident with a vertical plane of symmetry of the trunk route aircraft 102, and divides the trunk route fuselage 104 into the above-mentioned trunk route payload compartments 116. The longitudinal bulkhead 112 is configured as a structural member designed to be loaded in tension for carrying at least a portion of the internal pressurization load when the trunk route fuselage 104 is pressurized. The longitudinal bulkhead 112 may be a continuous panel or the longitudinal bulkhead 112 may be a truss structure. The load-carrying capability of the longitudinal bulkhead 112 may allow for a reduction in the structural mass of the trunk route aircraft 102 relative to the structural mass of a pressurized aircraft having a similar cross-sectional shape but lacking a longitudinal bulkhead 112.

As mentioned above, the trunk route aircraft 102 includes a vertical stabilizer 164 (FIG. 2) which may be coincident with a vertical centerline 126 (FIG. 4) of the trunk route aircraft 102. The longitudinal bulkhead 112 may be structurally coupled to the vertical stabilizer 164 which may allow the longitudinal bulkhead 112 to efficiently transfer at least a portion of the empennage loads (e.g., flight loads) to the trunk route fuselage 104. Absent a longitudinal bulkhead 112, such empennage loads would otherwise be transferred by the fuselage outer shell in a less efficient manner and potentially resulting in a fuselage of increased structural mass.

In the example of FIG. 4, the trunk route fuselage 104 is shown containing side-by-side lightweight ISO-geometry containers 200 in the trunk route payload compartments 116 separated by the longitudinal bulkhead 112. In the example shown, each one of the lightweight ISO-geometry containers 200 is configured as a 53-foot-long high-cube version 206 of an ISO-geometry container which, as mentioned above, has a container external width 212 (FIG. 24) of 8 feet and a container external height 210 (FIG. 24) of 9 feet 6 inches. The trunk route fuselage 104 is configured to closely conform to the cross-sectional shape and size of the high-cube version 206 of an ISO-geometry container such that the fuselage interior structure (e.g., a fuselage internal wall 124 or an inner liner 122) is in close proximity (e.g., within 2.5 inches) to the outer edges (e.g., corners fittings) of the high-cube version 206 of a lightweight ISO-geometry container 200. The small circles at each of the four corners of the lightweight ISO-geometry container 200 represent maximum clearance (e.g., 2.50 inches) with the fuselage internal structure. As may be appreciated, a trunk route aircraft 102 having a cross section capable of accommodating the above-noted geometry is also capable of accommodating high-cube versions 206 and standard-height versions 204 of shorter-length lightweight ISO-geometry containers 200 or container inserts 300, in addition to accommodating other smaller container types including, but not limited to, netted cargo pallets 380 and relatively small cargo containers 378 (e.g., FIG. 11).

The cross-sectional configuration (e.g., cross-sectional shape and cross-sectional size) of the trunk route fuselage 104 may be optimized to closely envelope the lightweight ISO-geometry containers 200 or container inserts 300 on each side of the longitudinal bulkhead 112 while minimizing the total wetted area of the trunk route fuselage 104 to thereby minimize aerodynamic drag. In this regard, the trunk route fuselage 104 may have a cross-section that minimizes the ratio of fuselage perimeter to total accommodated container cross-sectional area. In addition, the trunk route fuselage 104 may have a cross-section that minimizes the ratio of fuselage wetted area to total accommodated container volume. Minimizing the above-noted ratios allows for a reduction in the aerodynamic drag and structural mass of the trunk route fuselage 104.

Referring still to FIG. 4, the trunk route fuselage 104 may include a cargo supporting floor 134 for supporting the lightweight ISO-geometry containers 200 and/or container inserts 300 within the trunk route payload compartments 116. In one example, the cargo supporting floor 134 may be a continuous surface without voids. Alternatively, the cargo supporting floor 134 may be comprised of periodically arranged structural elements forming a grid structure (not shown). Although not shown, the cargo supporting floor 134 may be fitted with one or more roller trays, powered rollers, ball mats (e.g., powered ball mats), end stop fittings, side guide members, tie-down fittings and/or other mechanisms to assist in moving and securing the lightweight ISO-geometry container 200 and/or container inserts 300. Although not shown, the trunk route fuselage 104 may be fitted with internal winches or cranes to assist in loading and unloading the lightweight ISO-geometry containers 200 and container inserts 300.

In some examples, the cargo supporting floor 134 may be omitted, and a substantial portion of the trunk route fuselage 104 (e.g., an entire interior) may have a truss architecture (not shown) with mechanisms (e.g., rollers) to assist in moving the lightweight ISO-geometry container 200 and/or container inserts 300 into an out of the trunk route payload compartments 116. The truss architecture may include one or more mechanisms (e.g., tie-down fittings—not shown) for securing the corner fittings of the lightweight ISO-geometry container 200 and/or container inserts 300 to the wing-to-body joint 160. When secured to the trunk route fuselage 104 (e.g., via the cargo supporting floor 134), the lightweight ISO-geometry containers 200 and/or container inserts 300 may increase the overall structural integrity of the trunk route aircraft 102. For example, the strength and stiffness of the lightweight ISO-geometry containers 200 and/or the container inserts 300 may result in an increase in the overall strength and stiffness of the trunk route fuselage 104.

Referring to FIGS. 5-7, shown are several examples of cargo door 140 arrangements for a trunk route aircraft 102. As mentioned above, the fuselage forward end 106 and/or the fuselage aft end 108 of the trunk route fuselage 104 has at least one cargo door opening 136 having a cargo door sill 138. Each cargo door sill 138 may be at the same level as the cargo supporting floor 134. Each cargo door 140 is movable between an open position and a closed position. FIG. 5 shows an example of the fuselage forward end 106 of a trunk route aircraft 102 having side-opening cargo doors 144 including a left-opening cargo door and a right-opening cargo door for access respectively to the side-by-side (i.e., left-hand and right-hand) trunk route payload compartments 116 separated by the longitudinal bulkhead 112. The side-opening cargo doors 144 may be symmetric and may have cargo door hinges 142 located respectively on opposite sides of the trunk route fuselage 104. The cargo door hinges 142 may be approximate vertically oriented such that the side-opening cargo doors 144 open away from each other as shown in FIG. 5.

In FIG. 5, in some examples, the trunk route aircraft 102 may have a cockpit 184 located at the fuselage forward end 106 and configured to accommodate either a standard dual-pilot crew (e.g., a pilot and a co-pilot) or a reduced flight crew (e.g., a single pilot). The trunk route aircraft 102 may optionally include a camera system to facilitate reduced flight crew operations or autonomous operation. The cockpit 184 (e.g., dual-pilot or single-pilot) may be located forward of the forwardmost position of a lightweight ISO-geometry container 200 (FIG. 2) and/or container insert 300 in the trunk route fuselage 104. The cockpit 184 may be configured as a bubble-type cockpit and may be located above the one or more cargo doors 140 that may be included on the fuselage forward end 106.

In the example of FIG. 5, the cockpit 184 may be located above the narrow structure between the side-opening cargo doors. In some examples, the narrow structure between the two side-opening doors may include cameras 186 (FIG. 15) mounted behind small transparent windows incorporated into the fuselage outer surface. The camera system may include forward-looking cameras 186 as well as cameras 186 configured for imaging in upward and downward directions and cameras 186 configured for imaging in left and right directions. The camera system may provide visual input for a synthetic vision system providing the equivalent of a pilot's eye view. Imaging from the camera system may be used by any one of a variety of different functionalities including, but not limited to, image recognition, artificial intelligence, machine learning, flight control, autopilot, and/or flight management computer systems. The trunk route aircraft 102 may include additional cameras 186 positioned at any one of a variety of locations and oriented for imaging in any one of a variety of directions for use by any one of the above-described functionalities.

FIG. 6 shows an example of an upward-opening cargo door 146 located in the fuselage forward end 106 of a trunk route aircraft 102. In the example shown, the upward-opening cargo door 146 is a one-piece cargo door 140 enabling access to both of the trunk route payload compartments 116. The upward-opening cargo door 146 may include one or more cargo door hinges 142 located in the cargo door 140 upper end such as in the aft-upper corners on opposite sides of the upward-opening cargo door 146.

FIG. 7 shows an example of side-opening cargo doors 144 in the fuselage aft end 108 of a trunk route aircraft 102. The side-opening cargo doors 144 may be configured as symmetrical left-opening and right-opening cargo doors providing access respectively to the side-by-side trunk route payload compartments 116. In the example shown, each one of the side-opening cargo doors 144 is a multi-piece door having three portions including an aft door portion 148, a forward-upper door portion 150, and a forward-lower door portion 152. When each one of the side-opening cargo doors 144 is moved toward the open position, the aft door portion 148 is configured to rotate outwardly and upwardly independent of the forward-upper door portion 150 and forward-lower door portion 152. Due to the relatively large width of the trunk route fuselage 104 and the relatively low height of the cargo supporting floor 134 and cargo door sill 138 above ground level, the forward-lower door portion 152 is hingedly coupled to the forward-upper door portion 150 and is configured to fold against the inside of the forward-upper door portion 150 to provide ground clearance as the forward-upper door portion 150 rotates outwardly and upwardly from the closed position to the open position.

In some examples, the trunk route aircraft 102 may have having a loading ramp (not shown) that is extendable and/or outwardly pivotable from the fuselage forward end 106 or fuselage aft end 108 of the trunk route fuselage 104 to facilitate loading and unloading of the trunk route payload compartment 116. In still further examples, the loading ramp may function as part of a cargo door 140. A trunk route aircraft 102 may optionally include additional mechanisms (not shown) to assist in loading and unloading of the trunk route fuselage 104. For example, the fuselage forward end 106 or the fuselage aft end 108 may include a loading ramp having height-adjustment capability and/or lateral-alignment capability. In still further examples, the trunk route fuselage 104 may include a winch mechanism to facilitate loading and unloading.

Referring to FIGS. 5-8, the trunk route fuselage 104 in some examples is configured such that when the trunk route aircraft 102 is on the ground, the cargo supporting floor 134 and the cargo door sills 138 are no higher than a flatbed of a vehicle 400 (Figure A) or an autonomous ground equipment platform (e.g., an autonomous platform) such as an autonomous ground equipment vehicle 404 (FIG. 8) or other type of ground service equipment. Flatbed vehicles 400 may be provided in a variety of different configurations including, but not limited to, a flatbed dolly, a container dolly, a flatbed truck for 06 (FIG. 2), and a flatbed trailer 402 (FIG. 22) coupled to a semi-truck 406. Flatbed trailers 402 of a typical semi-truck 406 and flatbed autonomous ground equipment vehicles 404 or platforms typically have a height in the range of 1.5-5.5 feet. In this regard, the cargo supporting floor 134 and/or the cargo door sills 138 trunk route aircraft 102 may be no more than 5.5 feet above ground level. In some examples, the trunk route fuselage 104 may be configured such that the cargo supporting floor 134 and/or the cargo door sills 138 are no higher above ground level than the maximum container external height 210 (FIGS. 23-24) of an ISO-geometry container. For example, the cargo supporting floor 134 and/or the cargo door sills 138 may be no more than 8 feet 6 inches above ground level which is the container external height 210 of a standard-height ISO-geometry container. In other examples, the cargo supporting floor 134 and/or the cargo door sills 138 may be no more than 9 feet 6 inches above ground level which is the container external height 210 of a high-cube version 206 of an ISO-geometry container.

The horizontally-oriented double-bubble cross-sectional shape 114 (FIG. 4) enables the trunk route aircraft 102 to be of shorter length than would be required for an aircraft carrying the same quantity of lightweight ISO-geometry containers 200 or container inserts 300 arranged a single row. For the presently-disclosed trunk route aircraft 102 having cargo doors 140 at the fuselage aft end 108, the relatively short length of the trunk route aircraft 102 allows the cargo supporting floor 134 and cargo door sills 138 to be lower to the ground as fuselage height is at least partially dictated by requirements for ground clearance of the fuselage aft end 108 during takeoff rotation and during landing. In contrast, a longer aircraft dictates that the fuselage, and therefore the cargo floor and door sill, is higher above the ground to provide ground clearance for the fuselage aft end 108 during takeoff rotation and during landing.

Advantageously in the presently-disclosed trunk route aircraft 102, the low height of the cargo supporting floor 134 and cargo door sills 138 simplifies the transferring of lightweight ISO-geometry containers 200 and container inserts 300 between the trunk route aircraft 102 and ground transportation vehicles such as flatbed trucks 406 (FIG. 2), flatbed trailers 402 (FIG. 22), autonomous ground equipment vehicles 404 (FIG. 8), container dollies (not shown), and other types of ground transportation. For example, a low height of the cargo supporting floor 134 and cargo door sills 138 allows for horizontal loading and unloading of lightweight ISO-geometry containers 200 and container inserts 300 without the need for specialized ground support equipment (not shown) such as a ground loader, a forklift vehicle, a scissors jack or other equipment otherwise required for vertically lifting each lightweight ISO-geometry container 200 or container insert 300 up to the height of the cargo door sill 138 for loading.

As mentioned above, the trunk route aircraft 102 has a nose landing gear 168 (FIG. 6) and main landing gear 170 (FIG. 6), either or both of which may be configured as a height-adjustable kneeling landing gear 172 (FIGS. 6-7) for lowering the aircraft when non-moving on the ground. Such a kneeling landing gear 172 may be configured to lower the height of a cargo door sill 138 (FIGS. 5-7) above ground level. For example, the nose landing gear 168 may be a kneeling landing gear 172 configured to lower the height of the cargo door sill 138 at the fuselage forward end 106 to facilitate the loading and unloading of the trunk route payload compartments 116. The kneeling landing gear 172 may be configured as a jackable gear (not shown) or a shrink-link gear (not shown) configured to reduce the height of the trunk route fuselage 104 above ground level. For example, a kneeling landing gear 172 may be configured to lower the height of the cargo door sill 138 to a height that is substantially equivalent to the height of the above-mentioned flatbed truck 406 (FIG. 2) or flatbed trailer 402 (FIG. 22) or autonomous ground equipment vehicle 404. In still other examples described below (e.g., FIG. 20), the kneeling landing gear 172 of a trunk route aircraft 102 may lower the height of a cargo door sill 138 of the trunk route fuselage 104 to substantially match the height of the cargo door sill 138 of another aircraft such as a feeder route aircraft 118 (FIG. 20) as described below. In the case of loading ramps (not shown) such as a ground equipment loading ramp or an aircraft-integrated loading ramp, a kneeling landing gear 172 may be configured to lower the height of a cargo door sill 138 to facilitate a shorter or less-steep loading ramp as a means to facilitate the loading and unloading of lightweight ISO-geometry containers 200 and container inserts 300 into and out of the trunk route payload compartments 116.

Figure 10:
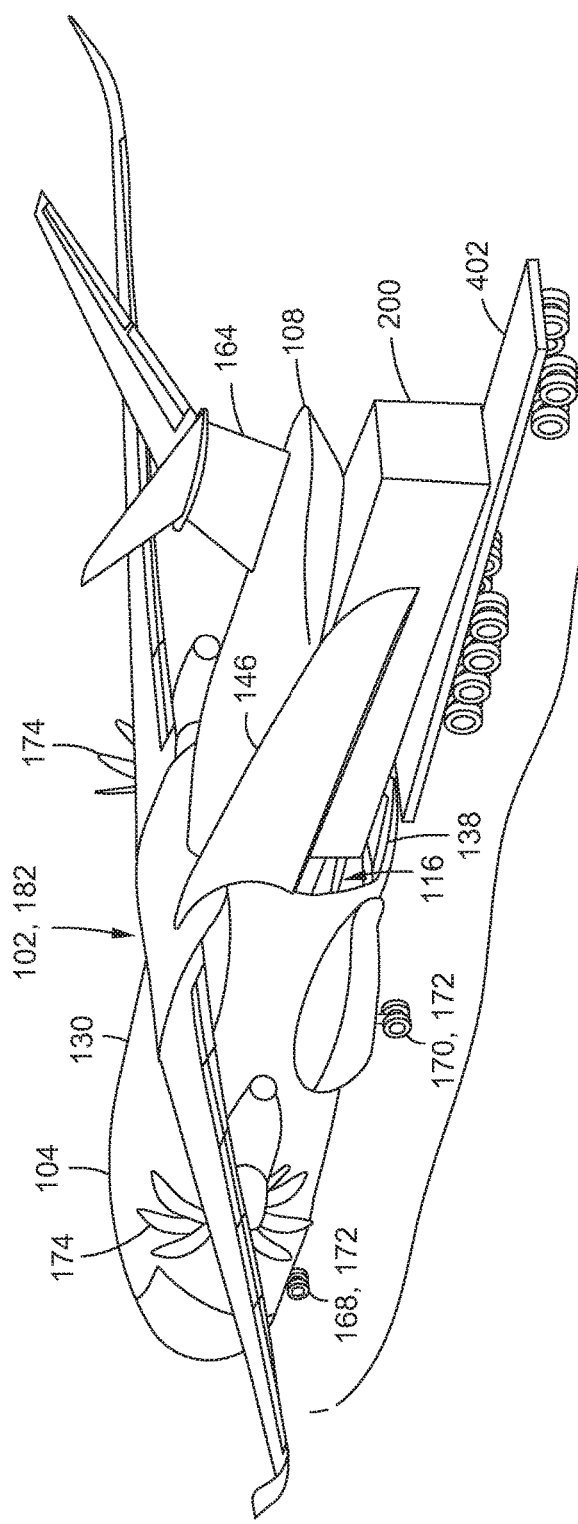
FIG. 10 is a perspective view of an example of a trunk route aircraft during transferring of a lightweight ISO-geometry container from a flatbed trailer through the fuselage aft end of the trunk route fuselage and into one of the trunk route payload compartments.

FIGS. 8-10 show an example of a high-wing configuration 182 of a trunk route aircraft 102 during the transferring of a lightweight ISO-geometry container 200 out of one of the trunk route payload compartments 116. The trunk route aircraft 102 has a main landing gear 170 and nose landing gear 168 provided in a low-height configuration, and which results in a correspondingly low height of the cargo door sills 138. The trunk route aircraft 102 include propulsors 174 supported by pylons 178 extending downwardly from the wings 166. Although the propulsors 174 are shown as turboprop engines driving counterrotating propellers, the propulsors 174 may be provided in any one of the above-described propulsor 174 configurations. The empennage includes a V-tail arrangement mounted on top of a relatively short vertical stabilizer 164. The trunk route fuselage 104 may be configured as described above including a double-bubble cross-sectional shape 114 having a longitudinal bulkhead 112 dividing the trunk route fuselage 104 into side-by-side trunk route payload compartments 116.

Referring still to FIGS. 8-10, the trunk route aircraft 102 includes a pair of side-opening cargo doors 144 including a left-opening and a right-opening cargo door respectively for the trunk route payload compartments 116. The left-opening cargo door is shown in the open position while the right-opening cargo door is shown in the closed position. A lightweight ISO-geometry container 200 is shown partially transferred out of one of the trunk route payload compartments 116 and onto a flatbed trailer 402 or autonomous ground equipment vehicle 404.

Although not shown, a loading-dock type of interface may be positioned between the trunk route aircraft 102 and the flatbed trailer 402 or autonomous ground equipment vehicle 404 to facilitate the transfer. For example, an autonomous flatbed vehicle (not shown) may interface directly with the forward end of a trunk route payload compartment 116. The trunk route aircraft 102 may include sensors configured to detect an approaching autonomous flatbed vehicle. The trunk route aircraft 102 may include computer subsystems and communication subsystems for sending signals to the approaching autonomous flatbed vehicle for steering into alignment and mating with the cargo door opening 136. Such signals may also be used to adjust the vertical height of the autonomous flatbed vehicle to match the height of the cargo door sill 138.

In other examples, the transferring of a lightweight ISO-geometry container 200 between a ground vehicle and the trunk route aircraft 102 may be facilitated by means of at least one loading ramp associated with the flatbed trailer 402 and/or associated with the trunk route fuselage 104. Even further, the trunk route aircraft 102 may include at least one kneeling landing gear 172 as described above for lowering the height of the cargo door sill 138 to approximately the same height as a ground vehicle such as a flatbed trailer 402 or other ground vehicle, such as an autonomous ground equipment vehicle 404, to facilitate smooth and safe transfer of the lightweight ISO-geometry container 200.

FIG. 9 shows an example of a high-wing configuration 182 of the trunk route aircraft 102 having an upward-opening cargo door 146 as an alternative to the side-opening cargo doors 144 shown in FIG. 8. As described above with regard to FIG. 5, the upward-opening cargo door 146 may be a one-piece cargo door 140 allowing simultaneous access to both of the trunk route payload compartments 116 through the cargo door opening 136 when the upward-opening cargo door 146 is in the fully open, upwardly rotated position.

FIG. 10 shows an example of a high-wing configuration 182 of the trunk route aircraft 102 having upward-opening cargo doors 146 located on the fuselage aft end 108 and illustrating the transfer of a lightweight ISO-geometry container 200 from a trunk route payload compartment 116 onto a flatbed trailer 402. The upward-opening cargo doors 146 include a left-opening cargo door and a right-opening cargo door respectfully providing access to the side-by-side trunk route payload compartments 116. Although upward-opening cargo doors 146 are shown, the trunk route fuselage 104 may alternatively be provided with laterally-opening clamshell doors (not shown). The trunk route aircraft 102 of FIG. 10 may include any or more of the above-described mechanisms to facilitate loading and unloading, including but not limited to, kneeling landing gear 172, transition ramps, loading ramps, winch mechanisms, or any one of a variety of other mechanisms.

Figure 11:
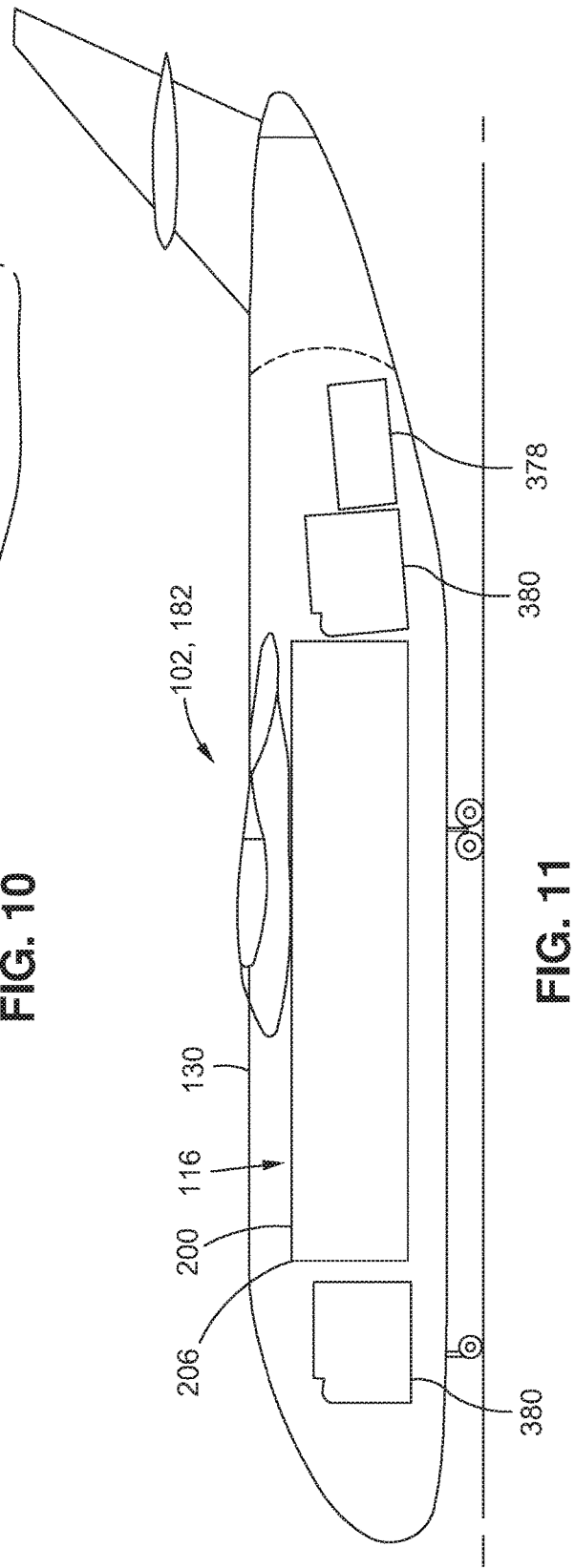
FIG. 11 is a side sectional view taken along the centerline of an example of a trunk route aircraft showing ISO-geometry containers loaded into the trunk route fuselage and further showing relatively small cargo pallets or cargo containers located in remaining spaces in the trunk route fuselage on opposite ends of the ISO-geometry container.

FIG. 11 is a side view of an example of a trunk route aircraft 102 showing a 53-foot-long high-cube version 206 of a lightweight ISO-geometry container 200 loaded into each one of the side-by-side trunk route payload compartments 116. Also shown is additional cargo in the form of smaller cargo pallets 380 and cargo containers 378 (e.g., ISO-defined LD-11 containers as known in the art) placed on opposite ends of each of the lightweight ISO-geometry containers 200. The trunk route fuselage 104 may be loaded in a variety of configurations. A first example of a cargo configuration enabling maximum range of the trunk route aircraft 102 includes two (2) 53-foot-long high-cube versions 206 of a lightweight ISO-geometry container 200 containing high density cargo (e.g., approximately 12 pounds/cubic feet). A second example of a cargo configuration enabling maximum range of the trunk route aircraft 102 includes two (2) 53-foot-long high-cube version 206 of a lightweight ISO-geometry container 200, plus four (4) cargo pallets (not shown) each 96 inches long by 96 inches wide by 125 inches tall, plus two (2) LD-11 cargo containers (not shown) loaded with moderate density (e.g., approximately 8 pounds/cubic feet). An example of a cargo configuration for short-range missions of the trunk route aircraft 102 at maximum zero fuel weight includes two (2) 53-foot-long high-cube versions 206 of a lightweight ISO-geometry container 200, plus four (4) cargo pallets each 96 inches long by 96 inches wide by 125 inches tall, plus two (2) LD-11 cargo containers loaded with high density (e.g., approximately 12 pounds/cubic feet).

Referring now to FIGS. 12-14, shown is an example of a feeder route aircraft 118 which is a second member of a freighter aircraft system 100 (FIGS. 19-20) as disclosed herein, the first member of which includes the above-described trunk route aircraft 102 shown in FIGS. 1-11. In FIGS. 12-14, the feeder route aircraft 118 may be described as a local commute freighter configured to operate from local airports with a range sufficient to reach relatively large commercial airports, cargo hubs, and international airports. For example, the feeder route aircraft 118 may have a maximum range of 500 nautical miles and a limited cruise altitude. The feeder route aircraft 118 has a feeder route fuselage 120 that may be unpressurized. However, in other examples, the feeder route fuselage 120 may be pressurized to a relatively low level such as to an atmospheric pressure equivalent to 10,000 feet above sea level.

The feeder route aircraft 118 has a nose landing gear 168 and main landing gear 170. The feeder route aircraft 118 includes a feeder route fuselage 120 having a feeder route payload compartment 121 configured for transporting either (1) a single 20-foot-long lightweight ISO-geometry container 200 or two 10-foot-long lightweight ISO-geometry containers 200 arranged end-to-end, or (2) a single 20-foot-long container insert 300 (e.g., FIG. 25-28) or two 10-foot-long container inserts 300 (e.g., FIG. 28) arranged end-to-end and configured to be received within a 20-foot-long lightweight ISO-geometry container 200 (FIG. 29). To provide a sense of scale, FIG. 14 shows an example of a flatbed truck for 06 next to the feeder route aircraft 118 and carrying a 20-foot-long lightweight ISO-geometry container 200.

The feeder route aircraft 118 has one or more propulsors 174 for forward thrust. In the example shown, the feeder route aircraft 118 has a pair of propulsors 174 each mounted on a pylon 178 and laterally supported by an overwing bridge 176. In the example shown, the propulsor 174 is a turbine engine driving counter rotating propellers. However, the propulsor 174 may be provided in alternative configurations including an open fan configuration, a high-bypass-ratio turbofan configuration, or other configurations described above.

The feeder route aircraft 118 has at least one wing 166 and may by provided in the low-wing configuration 180 shown in FIGS. 12-14. The wings 166 may extend at a mild sweep angle. The feeder route aircraft 118 includes an empennage which, in the example shown, has an H-tail configuration which may allow for a shorter length and reduced weight feeder route aircraft 118 capable of taking off in a relatively short distance. The H-tail configuration includes a pair of swept horizontal stabilizers 163 each having a vertical stabilizer 164 mounted on the end of the horizontal stabilizer 163. However, the empennage may be provided in alternative configurations not shown such as a T-tail configuration or a cruciform configuration.

Referring to FIG. 15, shown is an example of a forward end of a feeder route aircraft 118 which may be operated autonomously or with a reduced flight crew such as a single pilot. In one example, the feeder route aircraft 118 may have a cockpit 184 integrated into the upward-opening cargo door 146, and may optionally include a forward view navigation system comprising one or more cameras 186 and arranged in a manner similar to the optional camera system described above for the trunk route aircraft 102. However, in other examples not shown, the feeder route aircraft 118 may include a cockpit 184 for a dual-pilot crew (e.g., a pilot and a co-pilot).

Figure 16:
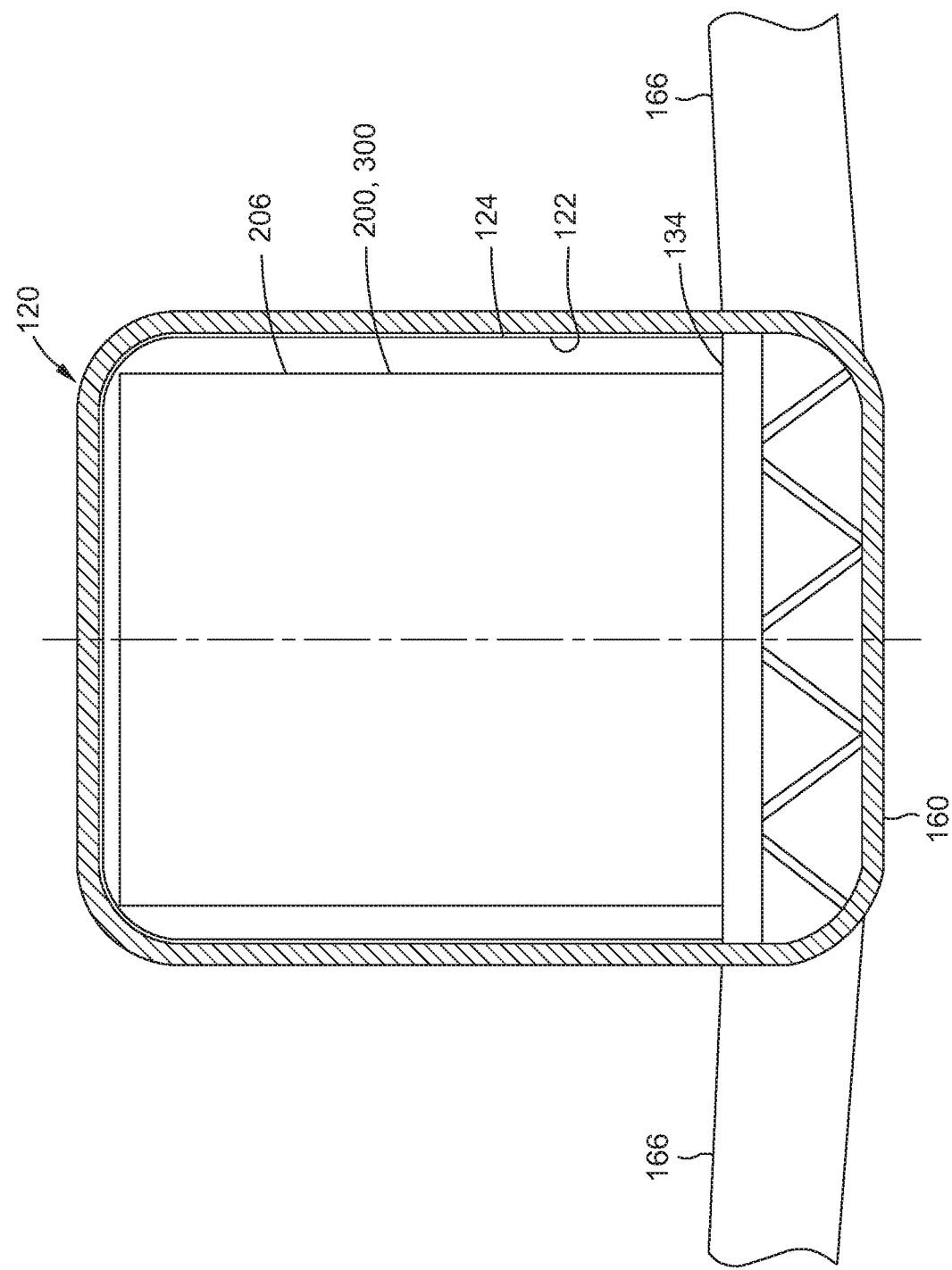
FIG. 16 is a sectional view of an example of a feeder route fuselage having a feeder route payload compartment for accommodating the cross-sectional shape of an ISO-geometry container or a container insert.

Referring to FIG. 16, shown is an example cross-sectional shape of a feeder route fuselage 120 defining a feeder route payload compartment 121 configured complementary to the cross-sectional shape and size of a lightweight ISO-geometry container 200 (e.g., a high-cube version 206 of an ISO-geometry container) or container insert 300 as described herein. The feeder route fuselage 120 has a cross-sectional shape and cross-sectional size configured to closely wrap around the cross-sectional shape and size of the lightweight ISO-geometry container 200 or container insert 300 as described above with regard to the trunk route payload compartments 116 (FIG. 4) of the trunk route aircraft 102 (FIG. 4). The fuselage internal wall 124 or inner liner 122 of the feeder route aircraft 118 is configured to be in close proximity (e.g., within 2.5 inches) to the outer edges (e.g., corners fittings) of a high-cube version 206 of a lightweight ISO-geometry container 200. In the example shown, the feeder route fuselage 120 has an orthogonal cross-sectional shape having straight sides and rounded corners. However in other examples not shown, the cross-sectional shape of the feeder route fuselage 120 may have straight sides with sharp (e.g., non-rounded) corners. In still further examples not shown, the cross-sectional shape of the feeder route fuselage 120 may have slightly rounded or ovalized sides that are connected with either rounded corners or sharp (e.g., non-rounded) corners. Regardless of the shape, the feeder route fuselage 120 may be optimized for minimal wetted area to minimize aerodynamic drag.

In FIG. 16, the feeder route fuselage 120 has a cargo supporting floor 134 for supporting a lightweight ISO-geometry container 200 or a container insert 300. The feeder route fuselage 120 may include a wing-to-body joint 160 located below the cargo supporting floor 134 and from which the wings 166 extend (FIG. 4). The feeder route fuselage 120 may be configured in a manner similar to above-described trunk route fuselage 104. For example, the cargo supporting floor 134 of the feeder route fuselage 120 may be a continuous without voids, or the cargo supporting floor 134 may be configured as grid structure (not shown). The cargo supporting floor 134 may include one or mechanisms (e.g., rollers, and fittings, die-down fittings, etc.) to assist in loading, securing, and unloading a lightweight ISO-geometry container 200 or container insert 300.

The feeder route fuselage 120 may be configured such that the cargo supporting floor 134 and cargo door sill 138 (FIG. 17) are relatively low to the ground to simplify loading and unloading of a lightweight ISO-geometry container 200 or container insert 300 from the feeder route payload compartment 121. For example, as described above with the trunk route aircraft 102, the cargo supporting floor 134 and cargo door sill 138 of the feeder route aircraft 118 is preferably no higher than a container dolly, a flatbed vehicle 400 (e.g., FIG. 17—a flatbed trailer 402 of a semi truck) or an autonomous ground equipment vehicle 404 which typically have height in the range of 1.5-5.5 feet as mentioned above.

Figure 17:
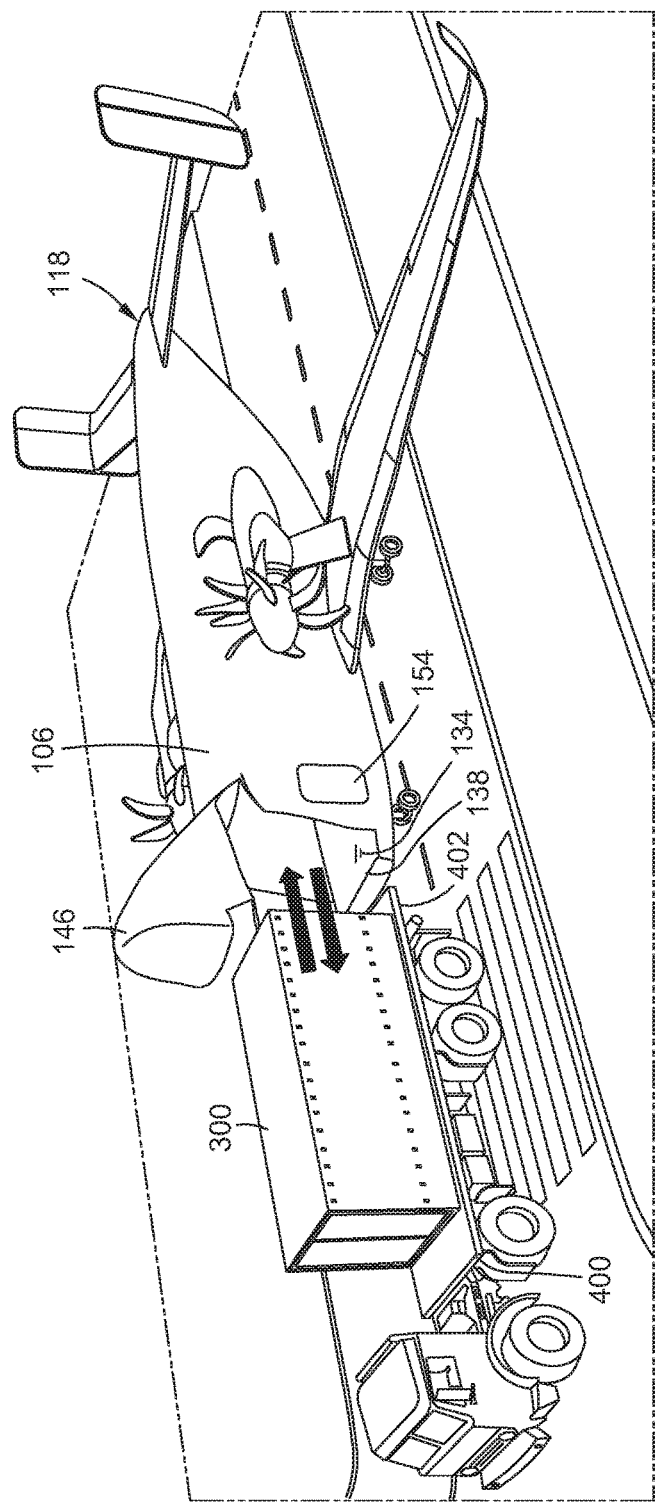
FIG. 17 is a perspective view of an example of a feeder route aircraft during the transferring of a lightweight ISO-geometry container from a flatbed trailer into the feeder route payload compartment of the feeder route fuselage.

FIG. 17 shows an example of a feeder route aircraft 118 with an upward-opening cargo door 146 in the open position allowing for the direct transfer of a lightweight ISO-geometry container 200 (FIG. 16) or container insert 300 from a flatbed truck into the feeder route payload compartment 121 of the feeder route aircraft 118 at an airport. Other equipment for vehicles such as an autonomous truck, an autonomous platform, or a container dolly may be implemented for transferring a lightweight ISO-geometry container 200 or container insert 300 into or out of the feeder route payload compartment 121. The feeder route fuselage 120 may include a crew hatch 154 to facilitate crew access into the feeder route fuselage 120.

Figure 18:
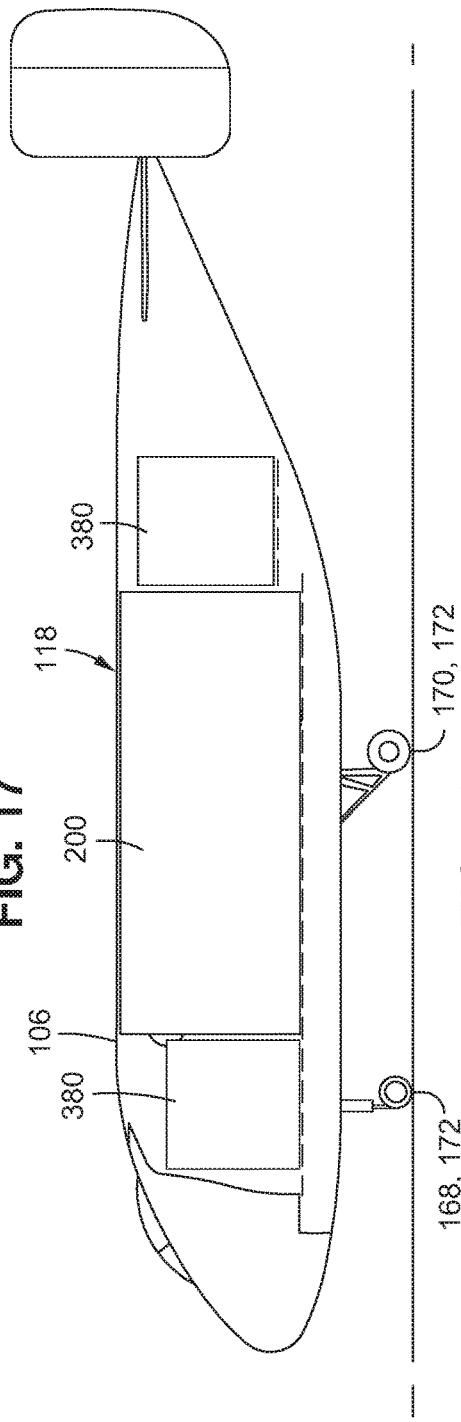
FIG. 18 is a side sectional view taken along the centerline of an example of a feeder route aircraft showing a lightweight ISO-geometry container loaded into the feeder route fuselage and further illustrating smaller sized containers located on opposite ends of the ISO-geometry container.

FIG. 18 is a side sectional view of an example of the placement of cargo within the feeder route aircraft 118. The example shows a 20-foot-long lightweight ISO-geometry container 200 loaded into the feeder route payload compartment 121 and further shows a cargo pallet 380 located on each of opposing ends of the lightweight ISO-geometry container 200. To assist in transferring of lightweight ISO-geometry container 200 and/or other cargo containers 378 (FIG. 11) and cargo pallets 380 with ground vehicles or other aircraft such as a trunk route aircraft 102, the nose landing gear 168 and/or the main landing gear 170 of the feeder route aircraft 118 may be height-adjustable in a manner similar to the height-adjustable landing gear described above for the trunk route aircraft 102. Alternatively or additionally, the feeder route aircraft 118 may include a loading ramp (not shown) at the fuselage forward end 106 and which may be height-adjustable and/or laterally alignable in the same manner described above for the optional loading ramp for the trunk route aircraft 102 (FIG. 20).

Figure 19:
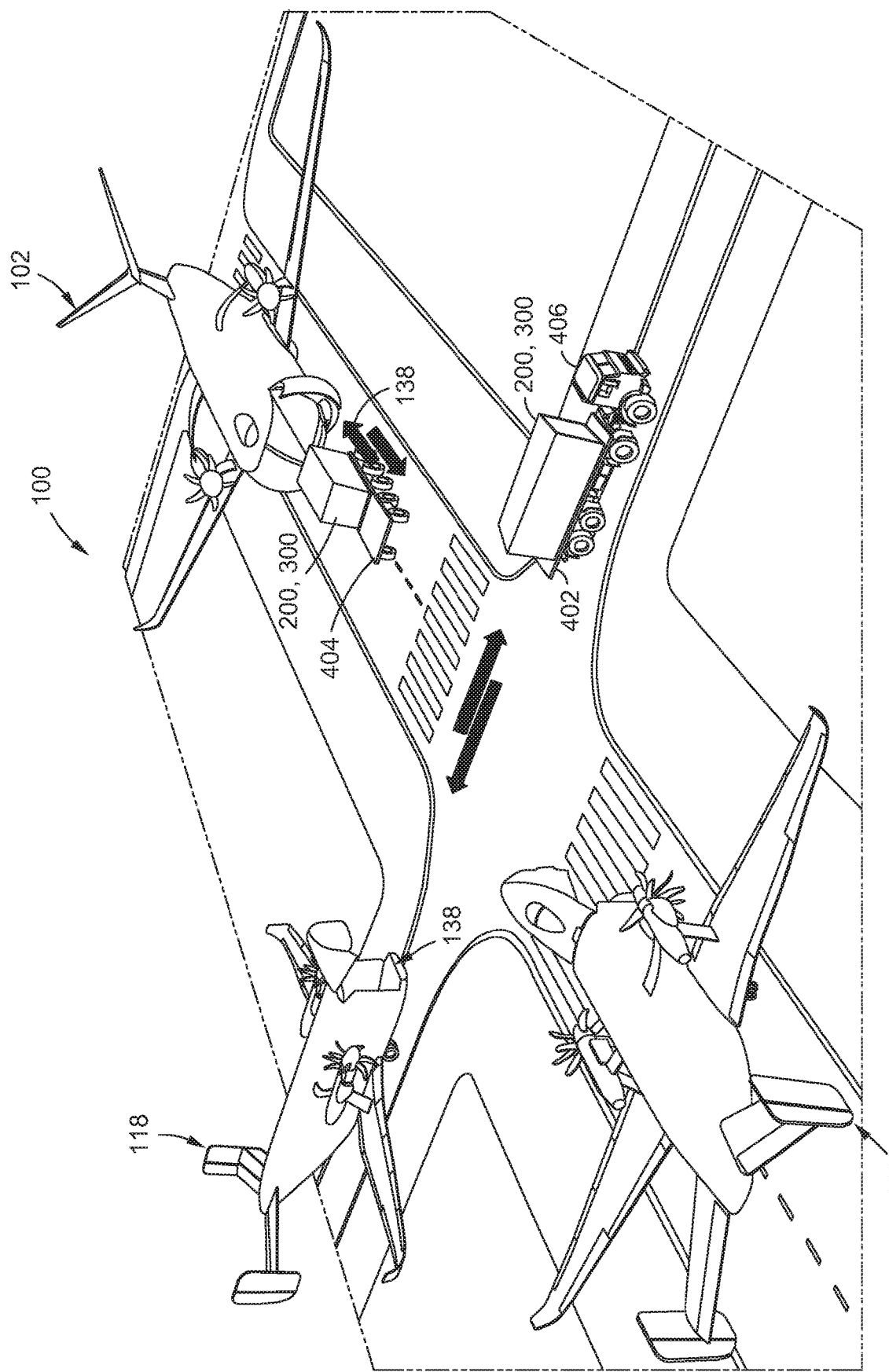
FIG. 19 is a perspective view of a trunk route aircraft and two feeder route aircraft at an airport during the transferring of one or more ISO-geometry containers or container inserts to and from the aircraft using a flatbed trailer of a semi truck and/or using a flatbed autonomous ground equipment vehicle.

Referring to FIG. 19, shown is a perspective view of an example of a trunk route aircraft 102 and two feeder route aircraft 118 at a local airport during the transfer of one or more lightweight ISO-geometry containers 200 or container inserts 300 to and from the aircraft using a flatbed trailer 402 of a semi truck 406 and/or a flatbed autonomous ground equipment vehicle 404. As mentioned above, the trunk route aircraft 102 and feeder route aircraft 118 comprise two members of the presently-disclosed freighter aircraft system 100 which enables seamless global freight transportation without the need for re-bulking of freight when transferring between ground transportation mode and air transportation mode. Advantageously, as described above, the feeder route aircraft 118 and the trunk route aircraft 102 are configured such that the cargo door sills 138 are at approximately the same height as the height of the above-mentioned ground transportation vehicles or devices such as flatbed trailers 402, flatbed trucks 406, container dollies, and autonomous ground equipment vehicles 404 or platforms. The common height of the cargo door sills 138 and ground transportation vehicles and devices simplifies the transfer of lightweight ISO-geometry containers 200 or container inserts 300 between aircraft 102, 118 and ground transportation.

Figure 20:
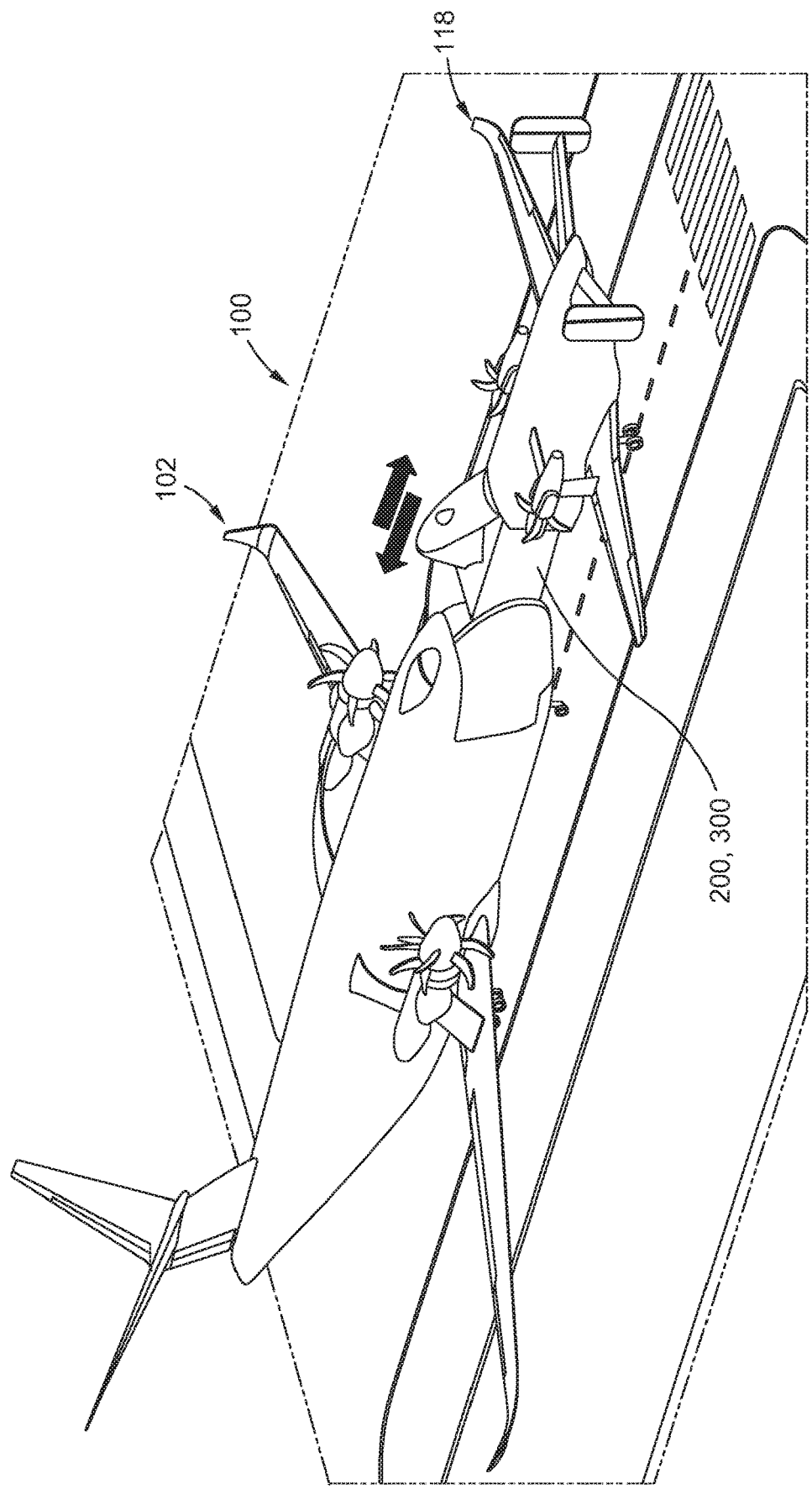
FIG. 20 is a perspective view of a trunk route aircraft and a feeder route aircraft at an airport during the direct transfer of a lightweight ISO-geometry container or container insert between the aircraft.

FIG. 20 shows an example of a trunk route aircraft 102 and a feeder route aircraft 118 at an airport illustrating the direct transfer of a lightweight ISO-geometry container 200 or container insert 300 between the aircraft. Advantageously, the relatively low height of the cargo door sills 138 (FIG. 19) of both aircraft 102, 118 may allow for the direct transfer of lightweight ISO-geometry containers 200 and container inserts 300 between a feeder route aircraft 118 and a trunk route aircraft 102. Alternatively, the transfer may be performed with the assistance of a flatbed autonomous ground equipment vehicle 404 having a flatbed surface (not shown). The flatbed surface has opposed ends configured to interface with the cargo door sill 138 respectively of the feeder route aircraft 118 and the trunk route aircraft 102. The height of the flatbed surface may be approximately 45-63 inches above ground level and which may be the approximate height of the cargo door sill 138 of the feeder route aircraft 118 and trunk route aircraft 102.

Figure 21:
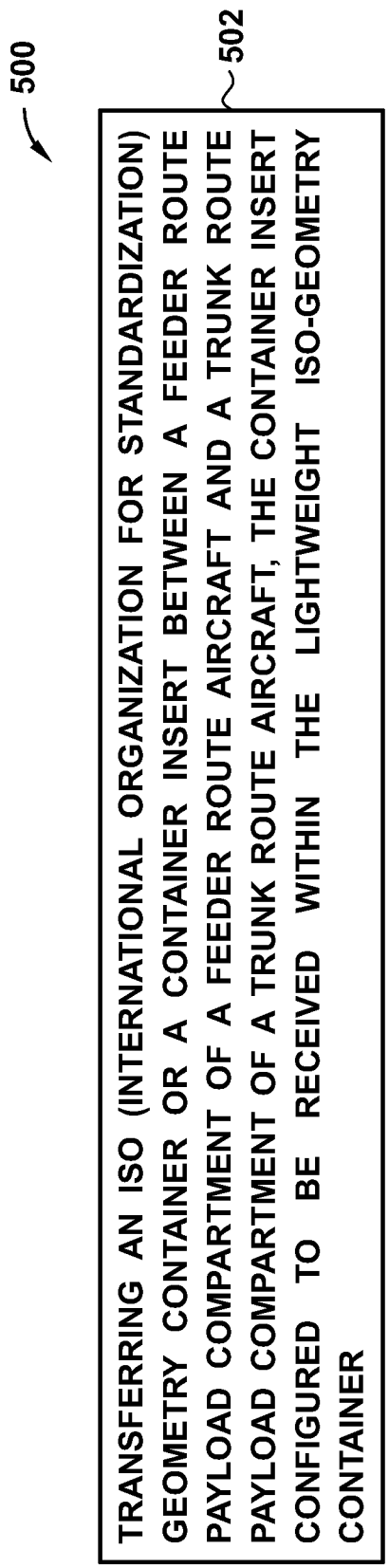
FIG. 21 is a flowchart of a method of transporting freight using a feeder route aircraft and a trunk route aircraft.

Referring to FIG. 21, shown is a flowchart of a method 500 of transporting freight using a feeder route aircraft 118 and a trunk route aircraft 102. Step 502 of the method includes transferring a lightweight ISO-geometry or a container insert 300 between a feeder route payload compartment 121 of a feeder route aircraft 118 and a trunk route payload compartment 116 of a trunk route aircraft 102. As described herein, the container insert 300 is configured to be received within the lightweight ISO-geometry container 200. As described above, the feeder route aircraft 118 has a feeder route fuselage 120 configured to receive one of the following: (1) a single 20-foot-long lightweight ISO-geometry container 200 or two 10-foot-long lightweight ISO-geometry containers 200 arranged end-to-end, or (2) a single 20-foot-long container insert 300 or two 10-foot-long container inserts 300 arranged end-to-end and configured to be received within a 20-foot-long lightweight ISO-geometry container 200. As is further indicated above, the trunk route aircraft 102 has a pressurized trunk route fuselage 104 and a generally vertically-oriented longitudinal bulkhead 112 configured to be loaded in tension when the fuselage is pressurized. The longitudinal bulkhead 112 divides the trunk route fuselage 104 interior into two side-by-side trunk route payload compartments 116. As mentioned above, the trunk route payload compartments 116 are each configured to receive one of the following: (1) a plurality of lightweight ISO-geometry containers 200 arranged end-to-end, (2) a plurality of container inserts 300 arranged end-to-end, or (3) a combination of one or more ISO-geometry containers and one or more container inserts 300 arranged end-to-end. As also mentioned above, the feeder route aircraft 118 and the trunk route aircraft 102 each have at least one wing 166 for supporting the aircraft during flight and at least one propulsor 174 for forward propulsion of the aircraft.

In some examples, the step of transferring a lightweight ISO-geometry container 200 comprises transferring a high-cube version 206 of a lightweight ISO-geometry container 200. As mentioned above, a high-cube version 206 of a lightweight ISO-geometry container 200 has a height of approximately 9 feet 6 inches as compared to a height of approximately 8 feet 6 inches for the standard-height version 204 of a lightweight ISO-geometry container 200. In still further examples, the step of transferring a lightweight ISO-geometry container 200 or container insert 300 may include transferring a lightweight ISO-geometry container 200 or a container insert 300 into or out of the trunk route payload compartment 116 of a trunk route fuselage 104 having a horizontally-oriented double-bubble cross-sectional shape 114. For example, FIGS. 8 and 10 show the transferring of a lightweight ISO-geometry container 200 from one of the trunk route payload compartments 116 of a high-wing configuration 182 of a trunk route aircraft 102 and onto a flatbed trailer 402.

In still further examples, the method may include transferring the lightweight ISO-geometry container 200 or container insert 300 when the cargo door sill 138 is no higher above ground level than the container external height 210. For example, the method may include adjusting, prior to transferring the lightweight ISO-geometry container 200 or container insert 300, a height of at least one landing gear of the feeder route aircraft 118 and/or the trunk route aircraft 102 for lowering the height of the cargo door sills 138. As mentioned above, the feeder route aircraft 118 and/or the trunk route aircraft 102 may include at least one kneeling landing gear 172 which may be adjusted until at least one of the cargo door sills 138 is at a height that approximately matches the height of a flatbed surface of a ground vehicle such as a flatbed of a truck 406 or an autonomous ground equipment vehicle 404.

FIG. 22 is a schematic view of an example of a freight delivery network for transporting freight without the need for re-bulking operations by using lightweight ISO-geometry containers 200 and container inserts 300 with the presently-disclosed two-member freighter aircraft system 100 in conjunction with surface transportation modes (e.g., truck 406, train 408, or ship 410). In examples where a shipment of freight includes air legs (e.g., using the freighter aircraft system 100) in addition to land legs (e.g., train 408 or semi-truck 406) and/or sea legs (e.g., container ship 410), the container inserts 300 are inserted into lightweight ISO-geometry containers 200 prior to going on the surface transportation legs. For example, as shown schematically at the top left-hand corner of FIG. 22, a supplier 414 may load a container insert 300 with freight. The container insert 300 may be loaded onto a flatbed trailer 402 of a semi-truck 406 and transported to a local airport where the container insert 300 may be directly transferred from the flatbed trailer 402 into the feeder route payload compartment 121 of a feeder route aircraft 118. The relatively low height of the cargo door sill 138 of the feeder route fuselage 120 allows for the direct transfer of the container insert 300 from the flatbed trailer 402 into the feeder route fuselage 120 without the need for specialized equipment such as a scissors jack for vertically lifting the container insert 300 up to the height of the cargo door sill 138.

Referring to the upper right-hand corner of FIG. 22, the feeder route aircraft 118 may fly to a large commercial airport, a cargo hub, or an international airport where the container insert 300 may be directly transferred from the feeder route payload compartment 121 of the feeder route aircraft 118 to the trunk route payload compartment 116 of a trunk route aircraft 102 (e.g., FIG. 20). The relatively low height of the cargo door sills 138 of both aircraft allows for the direct transfer of ISO-geometry containers and container inserts 300 between the feeder route aircraft 118 and the trunk route aircraft 102. In some examples, the transfer may be performed with the assistance of a flatbed autonomous ground equipment vehicle 404 (FIG. 19) having a flatbed surface. In still further examples, the trunk route aircraft 102 and/or the feeder route aircraft 118 may include a kneeling landing gear 172 as mentioned above for adjusting the height of the respective trunk route fuselage 104 and feeder route fuselage 120 four equalizing the height of the cargo door sills 138 of each aircraft 102, 118.

Referring still to FIG. 22, the trunk route aircraft 102 may fly a trans-oceanic or transcontinental mission to another commercial airport, cargo hub, or international airport where the container insert 300 may be transferred from the trunk route aircraft 102 to either a feeder route aircraft 118, or to a flatbed of a ground vehicle such as a flatbed trailer 402 of a semi-truck 406. For example, as shown schematically in the lower right-hand corner of FIG. 22, the container insert 300 may be directly transferred from the trunk route aircraft 102 to a feeder route aircraft 118 which may then fly to a regional airport where the container insert 300 may be transferred onto a flatbed truck 406 for eventual delivery to a consumer 416 (e.g., a warehouse, a retail establishment, an assembly plant, etc.). Alternatively, the container insert 300 may be transferred from the trunk route aircraft 102 to a flatbed trailer 402 which may deliver the container insert 300 to the consumer 416. In a still further example, the container insert 300 may be transferred from the trunk route aircraft 102 to a flatbed truck 406 which may deliver the container insert 300 to a shipyard where the container insert 300 may be inserted into a standard-weight ISO-geometry container 202 as schematically shown in the center portion of FIG. 22. The standard-weight ISO-geometry container 202 may be loaded onto a container ship 410 for transport to another port for eventual delivery to a consumer 416. Alternatively, the flatbed truck 406 may deliver the container insert 300 to a railyard where the container insert 300 may be inserted into an ISO-geometry container (e.g., standard-weight or lightweight) and loaded onto a flatbed rail car fort transport by train 408 to another railyard for eventual delivery to a consumer 416. After the container insert 300 is emptied of freight, the empty container insert 300 may be transported back to the supplier 414 as described below.

FIG. 23 shows an example of a 20-foot-long standard-height version 204 of a lightweight ISO-geometry container 200. FIG. 24 shows an example of a 40-foot-long high-cube version 206 of a lightweight ISO-geometry container 200. As mentioned above, a standard-height version 204 of an ISO-geometry container has a container external height 210 of approximately 8 feet 6 inches and a high-cube version 206 of an ISO-geometry container has a container external height 210 of approximately 9 feet 6 inches. As is also mentioned above, ISO-geometry containers (e.g., standard-weight and lightweight) are available in container external lengths 214 of 10, 20, 24, 28, 40, 44, 45, 46, 53, and 56 feet.

In FIGS. 23-24, the ISO-geometry container is comprised of container panels 216 coupled to a frame. The container panels 216 include an opposing pair of container side walls 218, a container floor 220, a container roof 222, a container end wall 224, and a container door 226 on one of the container ends. In the example shown, the container door 226 is configured as a pair of side-opening slab doors 328. As mentioned above, the external dimensions, the internal dimensions, and the minimum door opening dimensions of ISO-geometry containers are defined in the document ISO 668. As is noted above, lightweight ISO-geometry containers 200 have the same external dimensions as standard-weight ISO-geometry containers 202, but are comprised of lighter weight panels such as aluminum, composite, or sandwich (e.g., honeycomb) panels coupled to a steel frame, and which reduces the tare weight of lightweight ISO-geometry containers 200 to approximately 50 percent or more of the tare weight of standard-weight ISO-geometry containers 202 of the same size.

Figure 25:
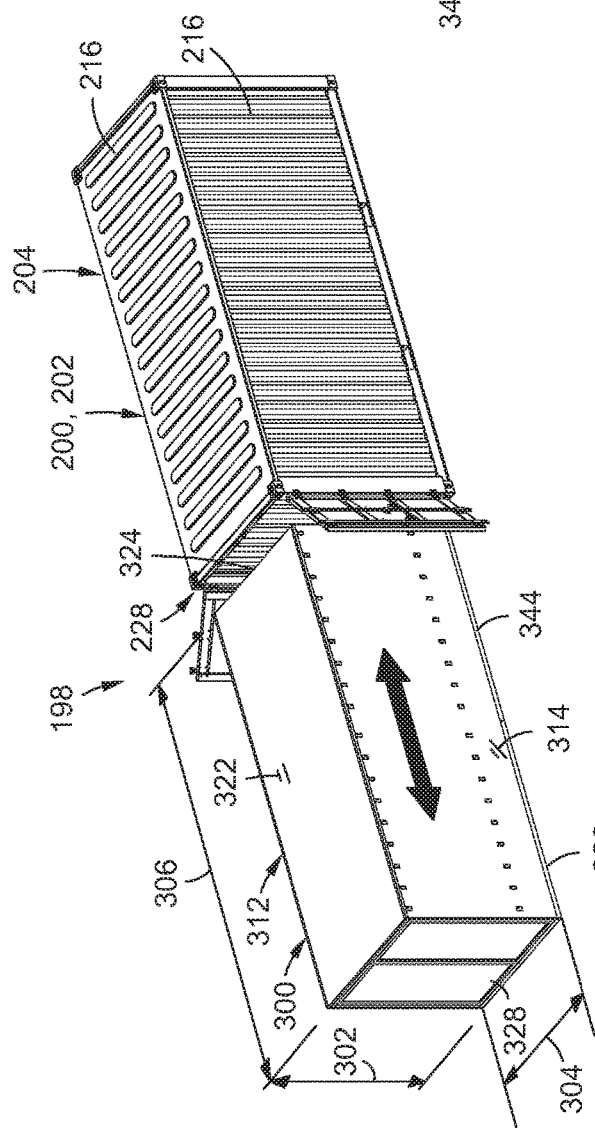
FIG. 25 is a perspective view of an example of a container system as disclosed herein and comprising a container insert and an ISO-geometry container (e.g., a lightweight ISO-geometry container)
Figure 29:
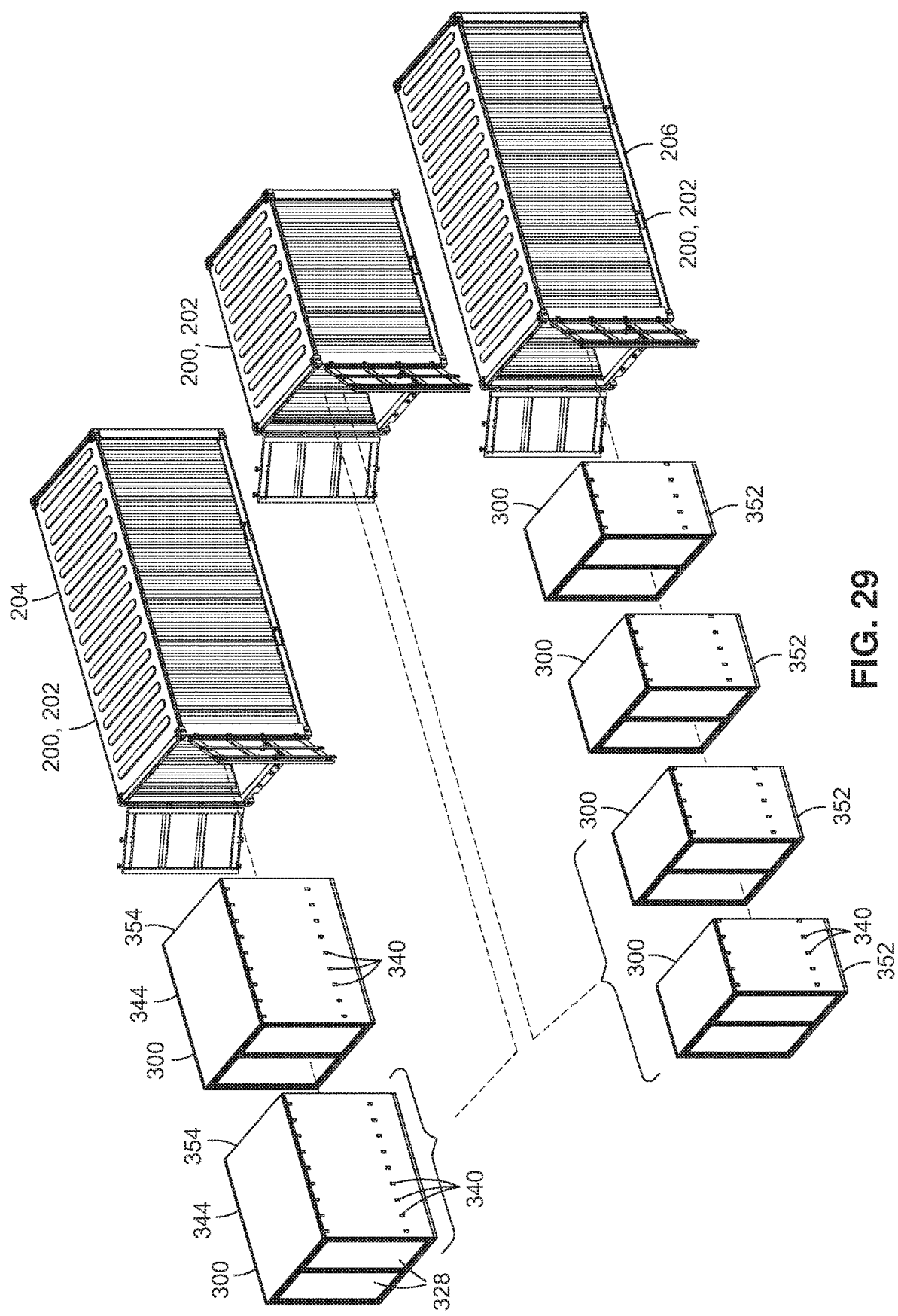
FIG. 29 is a perspective view of an example of a plurality of container inserts provided in fractional lengths of the container internal length of an ISO-geometry container.
Figure 30:
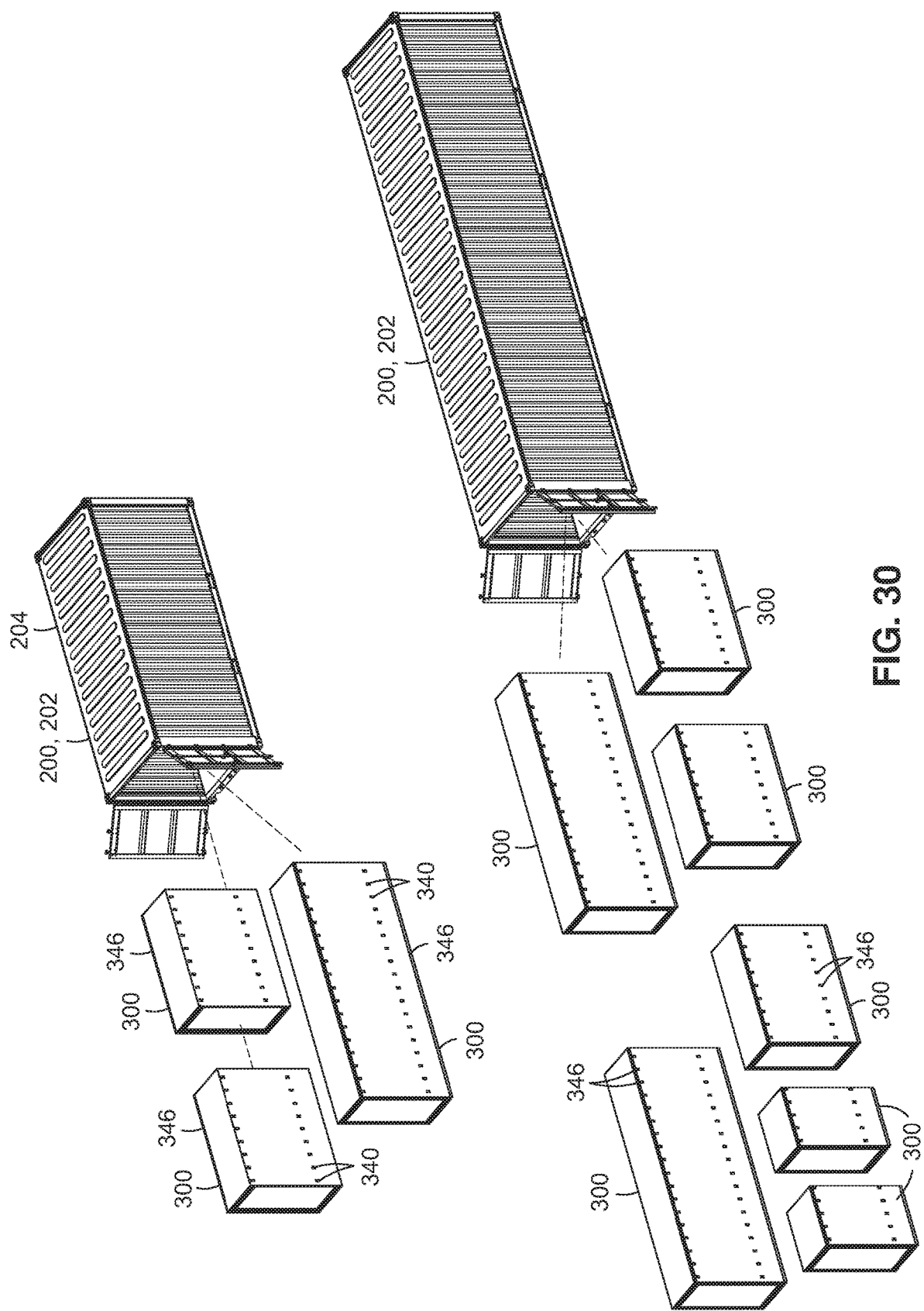
FIG. 30 is a perspective view of an example of a plurality of container inserts provided in fractional widths of the container internal width of an ISO-geometry container.
Figure 31:
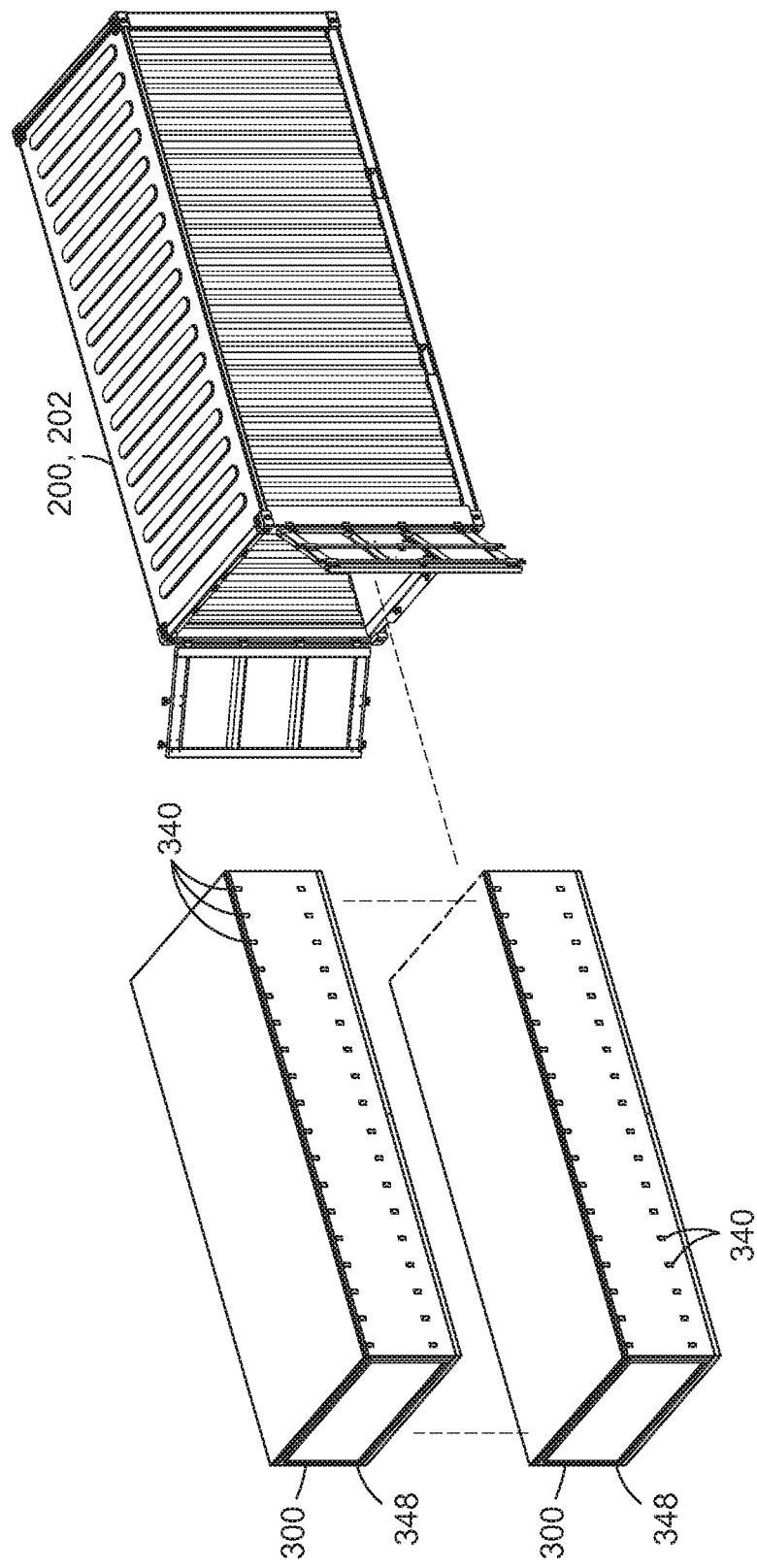
FIG. 31 is a perspective view of an example of two container inserts provided in fractional heights of the container internal height of an ISO-geometry container.

FIG. 25 is a perspective view of an example of a container system 198 as disclosed herein and which includes a lightweight ISO-geometry container 200 and a container insert 300 sized and configured to be received within an ISO-geometry container (standard-height or high-cube). FIG. 25 shows a 20-foot-long container insert 300 configured to be inserted into a 20-foot-long standard-height version 204 of a lightweight ISO-geometry container 200. However, as mentioned above, container inserts 300 may be provided in different sizes corresponding to the ISO-geometry container into which they are configured to be inserted. For example, container inserts 300 may be provided in insert external lengths 306 compatible with the container internal lengths associated with the above-mentioned container external lengths 214 of 10, 20, 24, 28, 40, 44, 45, 46, 53, and 56 feet. In FIG. 25, the container insert 300 is provided in a full-width/full-height configuration 344. However, as shown in FIGS. 29-31 and described in greater detail below, container inserts 300 may be provided in fractional sizes (e.g., fractional lengths, fractional widths, fractional heights) of the ISO-geometry container into which they are to be inserted.

The container insert 300 has an orthogonal shape and is comprised of lightweight insert panels 312 including an opposing pair of insert side walls 314, an insert floor 320, an insert roof 322, an insert end wall 324, and at least one insert door 326 which may be supported by an insert door frame 310. In the example of FIG. 25, the insert door 326 comprises a pair of side-opening slab doors 328. In any one of the container insert 300 examples disclosed herein, the insert panels 312 may be constructed of lightweight material including, but not limited to, aluminum plate or aluminum sheet, composite sheet (e.g., fiber-reinforced polymer matrix material such as graphite-epoxy), and/or sandwich panel construction comprising a core (e.g., honeycomb, foam, etc.) sandwiched between two face sheets (e.g., aluminum, composite, etc.). The container insert 300 may or may not include a rigid metallic or composite frame for increased strength and durability. In some examples, the container insert 300 may be configured to not have other container inserts 300 stacked on top of it which avoids the need for a heavy steel frame and thereby allows for a relatively lightweight container insert 300. For example, a container insert 300 may have a tare weight that is 5-6 times less than the tare weight of a standard-weight ISO-geometry container 202 of the same size. In this regard, a 20-foot-long standard-height container insert 300 may have a tare weight of approximately 800 pounds compared to a tare weight of approximately 2400 pounds for a lightweight ISO-geometry container 200 of the same size and a tare weight of approximately 4800 pounds for a standard-weight ISO-geometry of the same size.

The container insert 300 has insert external dimensions including an insert external height 302, an insert external width 304, and an insert external length 306 which are sized complementary respectively to the container internal height (standard-height or high-cube), container internal width, and container internal length as defined in the above-referenced document ISO 668. For example, the insert external height 302 and insert external width 304 are approximately equal to or slightly smaller than (e.g., by up to 0.50 inch) respectively the container internal height and container internal width, and may be no smaller than the minimum container door opening height (not shown) and minimum container door opening width (not shown) defined in the document ISO 668. In this regard, the container insert 300 is sized and configured to be moved in an out of the internal space of an ISO-geometry container 200, 202 with relatively tight clearances (e.g., less than 0.50 inch) between the exterior surfaces of the container insert 300 and the interior surfaces of the ISO-geometry container 200, 202.

Figure 26:
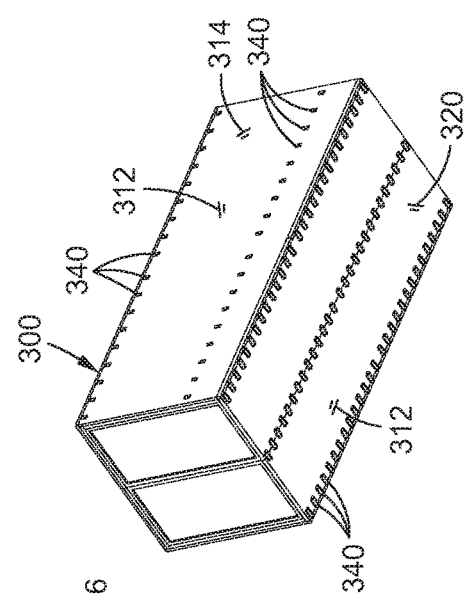
FIG. 26 is a further perspective view of an example of a container insert having insert rollers mounted to the insert side walls to facilitate sliding movement of the container insert into and out of the ISO-geometry container.
Figure 28:
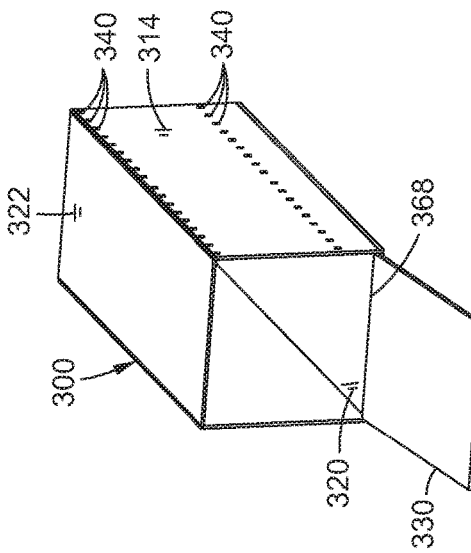
FIG. 28 is a perspective view of an example of a container insert having a ramp door hingedly coupled to the insert floor.
Figure 27:
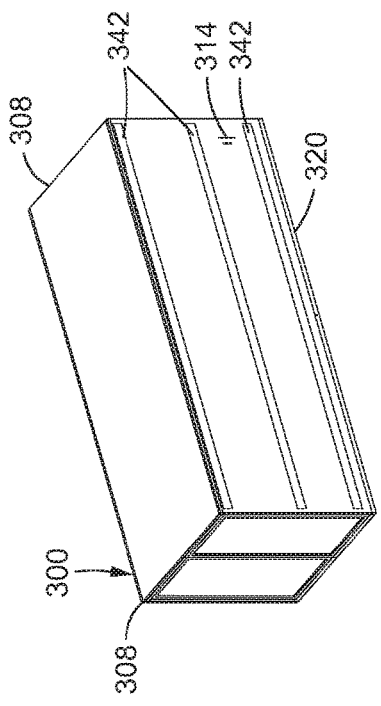
FIG. 27 is a perspective view of an example of a container insert having insert rub strips mounted on the insert floor to facilitate sliding movement of the container insert into and out of the ISO-geometry container.

Referring to FIGS. 26-28, shown are examples of a container insert 300 having insert handling mechanisms (e.g., the insert rollers 340, insert rub strips 342) mounted to the insert panels 312 to facilitate the movement of the container insert 300 into an out of an ISO-geometry container. FIG. 26 shows an example of a container insert 300 having insert rollers 340 mounted to the insert side walls 314 and the insert floor 320 to facilitate sliding movement of the container insert 300 into and out of the ISO-geometry container 200, 202. FIG. 27 shows an example of a container insert 300 having insert rub strips 342 mounted on each of the exterior surfaces of the insert side walls 314 and insert floor 320. The insert rub strips 342 may be formed of a low-friction material (e.g., Teflon™) to facilitate sliding movement of the container insert 300 into and out of the ISO-geometry container 200, 202. The insert rub strips 342 may extend lengthwise between the opposing insert ends 308 of the container insert 300.

FIG. 28 shows an example of a container insert 300 having a single ramp door 330 hingedly coupled to the insert floor 320 and extending across the entire width and height of the container insert 300. The container insert 300 includes a plurality of insert rollers 340 be arranged at spaced intervals in multiple rows that extend lengthwise along each of the insert floor 320 (not shown), the insert side walls 314, and the insert roof 322. In any one of the container insert 300 examples disclosed herein, the insert rollers 340 may be biased or spring-loaded and/or the insert rub strips 342 may be resiliently compressible to allow the container insert 300 to pass through the container door opening 228 (FIG. 25), after which the insert rollers 340 and/or the insert rub strips 342 may expand slightly outwardly against the inner surfaces of the container panels 216 (FIG. 25) of the ISO-geometry container 200, 202 to thereby keep the container insert 300 from moving around within the ISO-geometry container 200, 202. Although insert rollers 340 and insert rub strips 342 are shown, a container insert 300 may include any number of a variety of different insert handling mechanisms and/or devices to facilitate movement of container inserts 300 into an out of ISO-geometry containers 200, 202.

FIG. 29 shows examples of container inserts 300 provided in fractional lengths of the container internal length of an ISO-geometry container. Although each one of the container insert 300 is shown as having side-opening slab doors 328, any one of the container inserts 300 may include alternate door configurations such as the above-mentioned ramp door 330 (FIG. 28). In keeping with the nomenclature defined in ISO 668, each one of the container inserts 300 in FIG. 29 is described as a full-width/full-height configuration 344 in which the insert external width 304 (FIG. 25) is approximately equal to the container internal width, and the insert external height 302 (FIG. 25) is approximately equal to the container internal height. Fractional length container inserts 300 may be provided in any one a variety of lengths. For example, as shown in FIG. 29, a fractional length container insert 300 may be provided in a half-length configuration 354 in which the insert external length 306 (FIG. 25) of each container insert 300 is approximately (e.g., within 1 inch) one-half of the container internal length. As an example, the upper portion of FIG. 29 shows two 10-foot-long standard-height container inserts 300 configured to fit within the internal space of a 20-foot-long standard-height version 204 of a lightweight ISO-geometry container 200. The same two 10-foot-long standard-height container inserts 300 may also fit within the internal space of a 20-foot-long high-cube version 206 of a lightweight ISO-geometry container 200 shown on the right hand side of FIG. 29. Alternatively, 10-foot-long container inserts 300 may be provided in a high-cube version 206 in which the container external height 210 of each container insert 300 is approximately equal to the container internal height of a 20-foot-long high-cube version 206 of an ISO-geometry container.

In another example, a fractional length container insert 300 may be provided in a quarter-length configuration 352 in which the insert external length 306 (FIG. 25) is approximately (e.g., within 1 inch) one-quarter of the container internal length. The lower portion of FIG. 29 shows four 5-foot-long standard-height container inserts 300 configured to fit within the internal space of a 20-foot-long standard-height version 204 of a lightweight ISO-geometry container 200 or within the internal space the above-mentioned 20-foot-long high-cube version 206 of a lightweight ISO-geometry container 200. The same container insert 300 may also be referred to as a half-length container insert 300 for insertion into a 10-foot-long ISO-geometry container 200, 202 shown positioned between the two 20-foot-long container inserts 300 in FIG. 29. Other variations of the fractional length concept are possible. For example, a 15-foot-long container insert 300 may be defined as a three-quarter-length configuration 352 container insert 300 for occupying three quarters of the internal length of a 20-foot-long ISO-geometry container. The remainder of the 20-foot-long ISO-geometry container may be filled with a single 5-foot-long container insert 300. The fractional length concept may be applied to ISO-geometry containers of any length including ISO-geometry containers that have the above-mentioned lengths of 40, 45, and 50 feet.

As may be appreciated, an ISO-geometry container 200, 202 may be filled with any one of a variety of combinations of fractional length container inserts 300 if the sum of insert external lengths 306 is equal to the container internal length, or if additional smaller cargo containers 378 (FIG. 18) may be loaded into the ISO-geometry container 200, 202 to fill any space that cannot be filled by a fractional length container insert 300. For example, for an ISO-geometry container 200, 202 having a container external length 214 of 53 feet, two 20-foot-long container inserts 300 and one 10-foot-long container insert 300 may be placed inside the ISO-geometry container 200, 202, and additional cargo containers 378, cargo pallets 380, or spacers (not shown) may be loaded within the remaining 3 foot length of the container insert 300. In any one of the fractional size (e.g., fractional length, fractional width, fractional height) container inserts 300 disclosed herein, the insert panels 312 (e.g., the insert side walls 314, the insert floor 320, the insert roof 322) may include any one a variety of insert handling mechanisms such as the above-described insert rollers 340 (FIG. 26) and/or insert rub strips 342 (FIG. 20) to assist in moving the container inserts 300 into an out of the ISO-geometry container 200, 202.

FIG. 30 shows examples of container inserts 300 provided in a fractional width of the container internal width of a 20-foot-long ISO-geometry container 200, 202 and a 40-foot-long ISO-geometry container 200, 202. Some of the fractional width container inserts 300 are also provided in fractional lengths. In the example shown, the container inserts 300 are provided in a half-width/full-height configuration 346 in which the insert external width 304 (FIG. 25) is approximately (e.g., within 1 inch) one-half of the container internal width, and the insert external height 302 (FIG. 25) is approximately equal to the container internal height of either a standard-height version 204 of an ISO-geometry container 200, 202 or a high-cube version 206 (FIG. 29) of an ISO-geometry container 200, 202. For example, shown is a combination of two 10-foot-long half-width/full-height configuration 346 container inserts 300 for insertion into the left-hand side of the 20-foot-long ISO-geometry container 200, 202, and a single 20-foot-long half-width/full-height configuration 346 container insert 300 for insertion into the right-hand side of the 20-foot-long ISO-geometry container 200, 202. In another example, shown is a combination of two 20-foot-long half-width/full-height configuration 346 container inserts 300 for insertion into the left-hand side of the 40-foot-long ISO-geometry container 200, 202, and three 10-foot-long half-width/full-height configuration 346 container inserts 300 and two 5-foot-long half-width/full-height configuration 346 container inserts 300 for insertion into the right-hand side of the 40-foot-long ISO-geometry container 200, 202. As may be appreciated, an ISO-geometry container of any length may be filled with any combination of half-width/full-height configuration 346 container inserts 300. As mentioned above, container inserts 300 may be provided in a container external height 210 that is equivalent to the height of either a standard-height version 204 of an ISO-geometry container 200, 202 or a high-cube version 206 of an ISO-geometry container 200, 202.

FIG. 31 shows an example of container inserts 300 provided in fractional heights of the container internal height and which are stackable inside an ISO-geometry container 200, 202. Such half-height configuration container inserts 300 may include a loading hatch (not shown) on the upper side of the container insert 300. In the example shown, the container inserts 300 are provided in a full-width/half-height configuration 348 in which the insert external width 304 (FIG. 25) of each container insert 300 is approximately (e.g., within 1 inch) equal to the container internal width, and the insert external height 302 (FIG. 25) of each container insert 300 is approximately (e.g., within 1 inch) is one-half of the container internal height. Shown are two 20-foot-long full-width/half-height configuration 348 container inserts 300 stacked on top of each other and configured to be inserted into a 20-foot-long ISO-geometry container 200, 202. However, the internal volume of a 20-foot-long ISO-geometry container 200, 202 may be filled with any one of a variety of 10-foot-long container inserts 300 including, but not limited to, a single 10-foot-long full-width/full-height configuration 344 (FIG. 25) container insert 300, or two 10-foot-long half-width/full-height configuration 346 container inserts 300, or two 10-foot-long full-width/half-height configuration 348 container inserts 300, or an appropriate number of 5-foot-long container inserts 300 having the appropriate fractional width and fractional height configuration. As may be appreciated, an ISO-geometry container 200, 202 of any length may be filled with any combination of full-width/half-height configuration 348 container inserts 300, and which may also be combined with any one of the other presently-disclosed container insert configurations. In a still further example not shown, container inserts 300 may be provided in a half-width/half-height configuration in which the insert external width 304 is approximately (e.g., within 1 inch) one-half of the container internal width, and the insert external height 302 is approximately (e.g., within 1 inch) one-half of the container internal height.

FIGS. 32-42 show an example of a container insert 300 having a foldable configuration 360 for reducing the volume occupied by the container insert 300 after the removal of freight to reduce the cost of returning the container insert 300 to the point of origin. For example, as shown in FIGS. 47-51 and described below, a plurality of container inserts 300 in the folded state 364 may be stacked horizontally or vertically inside one or more ISO-geometry containers 200, 202 and shipped back to the point of origin via ground transportation (e.g., truck 406 or train 408) or sea transportation (e.g., container ship 410). Alternatively or additionally, a plurality of container inserts 300 in the folded state 364 may be stacked horizontally or vertically and secured inside and aircraft such as the above-described trunk route aircraft 102 and/or feeder route aircraft 118.

FIGS. 32-42 illustrate a progression of steps for folding a container insert 300 from an erected state 362 (FIG. 25) to a folded state 364 (FIG. 41). The example shown is a 10-foot-long container insert 300. However, the foldable configuration 360 may be implemented in container inserts 300 of any length. As described above, the container insert 300 is comprised of a plurality of insert panels 312 each having panel edges. The insert panels 312 include an opposing pair of insert side walls 314 (e.g., a first insert side wall 316 and a second insert side wall 318), an insert floor 320, an insert roof 322, an insert end wall 324, and an insert door 326 which may optionally be supported by an insert door frame 310. In the example shown, the insert door 326 is configured as a pair of side-opening slab doors 328 each coupled by a hinge member 368 to an insert side wall 314. However, in other examples (FIG. 28), the insert door 326 may be configured as a ramp door 330 coupled by a hinge member 368 to the insert floor 320.

The panel edges of at least some of the insert panels 312 may be interconnected by a hinge member 368 configured to allow for rotation of the insert panels 312 relative to each other for folding the insert panels 312 into a stacked arrangement on top of each other for transitioning the container insert 300 between the erected state 362 and the folded state 364. In one example, the hinge member 368 may be a mechanical hinge (e.g., a piano-type hinge having a removable hinge pin). In another example, the hinge member 368 may be a flexible-material hinge. However, the hinge member 368 may be provided in any one of a variety of different configurations.

In addition, as described below, the panel edges of some of the insert panels 312 may be removably coupled to each other via an edge joining mechanism 366 (e.g., a dovetail joint—FIG. 34) to allow the some of the insert panels 312 to be disconnected from each other to allow the container insert 300 to be folded. For example, the side edges and the upper edge of the insert door frame 310 may be removably coupled respectively to the side edges and the upper edge respectively of the insert side walls 314 and insert roof 322 via an edge joining mechanism 366 at each juncture of the adjoining panel edges. Similarly, the side edges and the upper edge of the insert end wall 324 may be removably coupled respectively to the side edges and the upper edge respectively of the insert side walls 314 and insert roof 322 via an edge joining mechanism 366. Furthermore, the upper edge of one of the insert side panels may be removably coupled to the insert roof 322 via an edge joining mechanism 366, as described below.

Referring to FIG. 32, shown is a first step of folding the container insert 300 in which the insert door frame 310 is disconnected from the insert side walls 314 and insert roof 322, and the insert door frame 310 and slab doors 328 are folded approximately 90 degrees downwardly onto the insert floor 320. For examples where the insert door 326 is configured as a ramp door 330, the ramp door 330 may be disconnected from the insert side walls 314 and insert roof 322 prior to folding the wrap door 330 downwardly onto the insert floor 320.

FIG. 33 shows a second step of folding the container insert 300 in which the insert end wall 324 is disconnected (e.g., via the edge joining mechanisms 366) from the insert side walls 314 and insert roof 322, and the insert end wall 324 is folded about the hinge member 368 approximately 90 degrees downwardly onto the slab doors 328. FIG. 34 shows an example of an edge joining mechanism 366 for removably connecting adjoining panel such as the removable connection between the insert roof 322 and a first insert side wall 316. In the example shown, the edge joining mechanism 366 is configured as a dovetail joint having a series of pins incorporated into one panel edge and a complementary series of tails incorporated into the adjoining panel edge. As may be appreciated, the edge joining mechanism 366 may be provided in a variety of configurations, and is not limited to a dovetail configuration. For example, the edge joining mechanism 366 may comprise a piano hinge (not shown) in which the hinge pin is removable. In another example, the edge joining mechanism 366 may comprise a zipper-type joint (not shown).

FIG. 35 shows a first insert side wall 316 (i.e., left-hand side wall) being folded about the hinge member 368 approximately 90 degrees downwardly toward the insert end wall 324 during a third step of folding the container insert 300 into a folded state 364. FIG. 36 shows the first insert side wall 316 lying flat against the insert end wall 324. It should be noted that the vertical location of each hinge member 368 may be progressively higher to accommodate the gauge or thickness of the previously folded insert panels 312. For example, the vertical location of the hinge member 368 for the first insert side wall 316 may be higher than the vertical location of the hinge member 368 for the insert end wall 324. Likewise, the vertical location of the hinge member 368 for the second insert side wall 318 may be higher than the vertical location of the hinge member 368 for the first insert side wall 316.

FIG. 37 shows the second insert side wall 318 being folded about the hinge member 368 approximately 90 degrees downwardly onto the first insert side wall 316 during a fourth step of folding the container insert 300 into the folded state 364. FIG. 38 shows the insert roof 322 being folded upwardly about the hinge member 368 while the second insert side wall 318 is folded downwardly onto the first insert side wall 316. FIG. 39 shows the second insert side wall 318 lying flat against the first insert side wall 316. FIG. 40 shows the continuation of the of the insert roof 322 over toward the second insert side wall 318 in the final step of folding the container insert 300 from the erected state 362 to the folded state 364. FIG. 41 shows the container insert 300 in the folded state 364 with the insert roof 322 lying flat against the second insert side wall 318. It should be noted that the insert roof 322 may require an extra hinge member 368 for folding purposes to ensure that the insert roof 322 does not extend beyond the side of the container insert 300 in the folded state 364, thereby ensuring a relatively compact size of the container insert 300 in the folded state 364 within an ISO-geometry container 200, 202. FIG. 42 is a magnified view of a portion of the container insert 300 identified by reference numeral 42 in FIG. 41, and showing the extra hinge member 368 that may be included with the insert roof 322. Although not shown, the container insert 300 may include one or more clamps or other mechanisms for securing the container insert 300 in the folded state 364.

Referring to FIGS. 43-46, shown is an example of a container insert 300 in which some of the insert panels 312 are flexible or collapsible to enable transitioning the container insert 300 between an erected state 362 and a folded state 364. As mentioned above, the volume occupied by a container insert 300 in the folded state 364 is greatly reduced to the volume occupied by the container insert 300 in the erected state 362. Container inserts 300 in the folded state 364 may be stacked vertically or horizontally within an ISO-geometry container 200, 202 (FIGS. 47-51) for cost-effective shipping via surface transportation back to the place of origin. Alternatively, container inserts 300 in the folded state 364 may be stacked vertically or horizontally and secured within an aircraft for air transportation back to the place of origin.

FIG. 43 shows an example of a container insert 300 having insert panels 312 that have an accordion-style configuration 370 allowing the insert panels 312 to be collapsed along the in-plane direction (e.g., along a direction parallel to the insert length) for transitioning the container insert 300 from the erected state 362 to the folded state 364. In one example, the collapsible insert panels 312 may include panel ribs 372 or frames having an inverted U-shape to provide structural integrity to the insert side walls 314 and the insert roof 322. The panel ribs 372 may be spaced apart from each other and may provide strength and rigidity to the insert side walls 314 and insert roof 322 and maintain the orthogonal shape of the container insert 300 in the erected state 362. The insert side walls 314 and insert roof 322 may be formed of a flexible, high-strength material supported by the panel ribs 372 and having an in-plane flexibility or foldability to enable accordion-style collapsing of the insert side walls 314 and insert roof 322. The insert side walls 314 and insert roof 322 may be described as an accordion-type shell 374 comprising a plurality of panel portions (not shown) supported by the panel ribs 372 and being foldable along a plurality of spaced parallel fold lines oriented normal to the direction of collapsing of the insert side walls 314 and insert roof 322. In one example, the insert side walls 314 and insert roof 322 may be formed of a flexible mesh.

In FIG. 43, the container insert 300 may additionally include rail guides 376 or tracks located on each of the opposing sides of the container insert 300. The bottom ends of each panel rib may be engaged to the rail guides 376 and may be movable along the rail guides 376 during accordion-style collapsing of the insert side walls 314 and the insert roof 322. The container insert 300 may additionally include an insert door frame 310 supporting the insert door 326. The bottom ends on each side of the insert door frame 310 may be hingedly coupled to the insert floor 320 via a hinge member 368 as described above.

FIG. 44 shows the insert side walls 314 and the insert roof 322 after being disconnected from the insert door frame 310. The insert side walls 314 and insert roof 322 are being collapsed in an accordion-style manner. During collapsing of the insert side walls 314 and insert roof 322, the panel ribs 372 slide along the rail guides 376 located on the opposing sides of the insert floor 320. FIG. 45 shows the insert door frame 310 and slab door folded about the hinge member 368 approximately 90 degrees downwardly onto the insert floor 320. The insert side wall and insert roof 322 are in a fully collapsed state. FIG. 46 shows the insert end wall 324, the insert side walls 314, and insert roof 322 after folding as a unit downwardly onto the slab door and placing the container insert 300 in the folded state 364. Although not shown, the container insert 300 may include a hinge member 368 on the opposing bottom ends of at least one of the panel ribs 372 to allow for the folding of the insert end wall 324, the insert side walls 314, and insert roof 322. The container insert 300 in FIG. 46 may include one or more clamps for securing the container insert 300 in the folded state 364.

Referring to FIGS. 47-51, shown are several examples of container inserts 300 in the folded state 364 may be loaded in stacked formation into an ISO-geometry container 200, 202 for shipping back to their place of origin. FIG. 47 is a side schematic view of an example of a 10-foot-long ISO-geometry container 200, 202 containing a single horizontal stack of seven 10-foot-long container inserts 300 in a folded state 364. Although shown arranged in a horizontal stack, in an alternative example the 10-foot-long container inserts 300 may be arranged in a vertical stack with an ISO-geometry container 200, 202. FIG. 48 is a side schematic view of an example of a 20-foot-long ISO-geometry container 200, 202 containing two side-by-side stacks of seven 10-foot-long container inserts 300 each in a folded state 364. FIG. 49 is a side schematic view of an example of a 20-foot-long ISO-geometry container 200, 202 containing a single stack of 20-foot-long container inserts 300 each in a folded state 364.

FIGS. 50-51 show examples of stacks of container inserts 300 in the folded state 364 loaded into an ISO-geometry container 200, 202 along with one or more container inserts 300 in the erected state 362. The container inserts 300 in the erected state 362 may either be empty or loaded with freight. FIG. 50 is a side schematic view of an example of a 40-foot-long ISO-geometry container 200, 202 containing three 10-foot-long container inserts 300 each in an erected state 362, and also containing a single stack of 10-foot-long container inserts 300 each in a folded state 364. FIG. 51 shows an example of a 40-foot-long ISO-geometry container 200, 202 containing one 10-foot-long container insert 300 in an erected state 362, one stack of 10-foot-long container inserts 300 in a folded state 364, and one stack of 20-foot-long container inserts 300 each in a folded state 364. As may be appreciated, container inserts 300 in the folded state 364 may be transported in any combination with container inserts 300 in the erected state 362.

Figure 52:
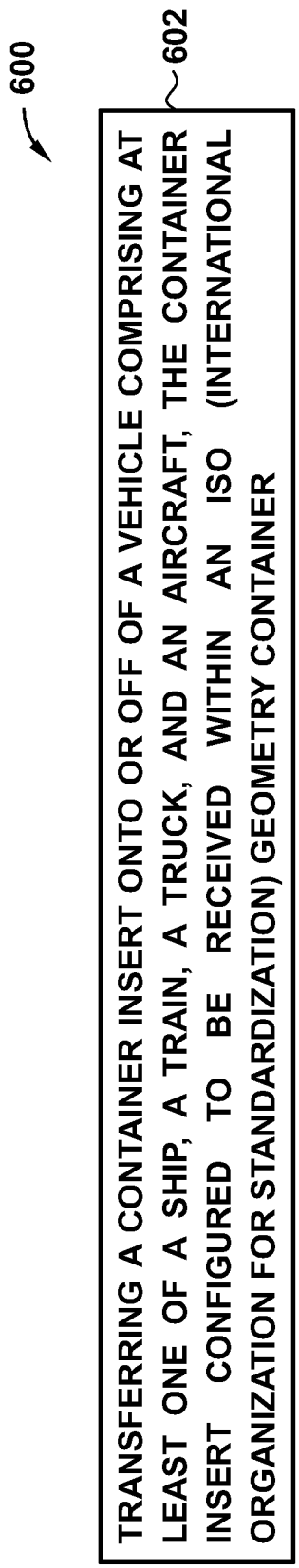
FIG. 52 is a flowchart of a method of transporting freight using a container insert configured to be received within an ISO-geometry container.
Figure 53:
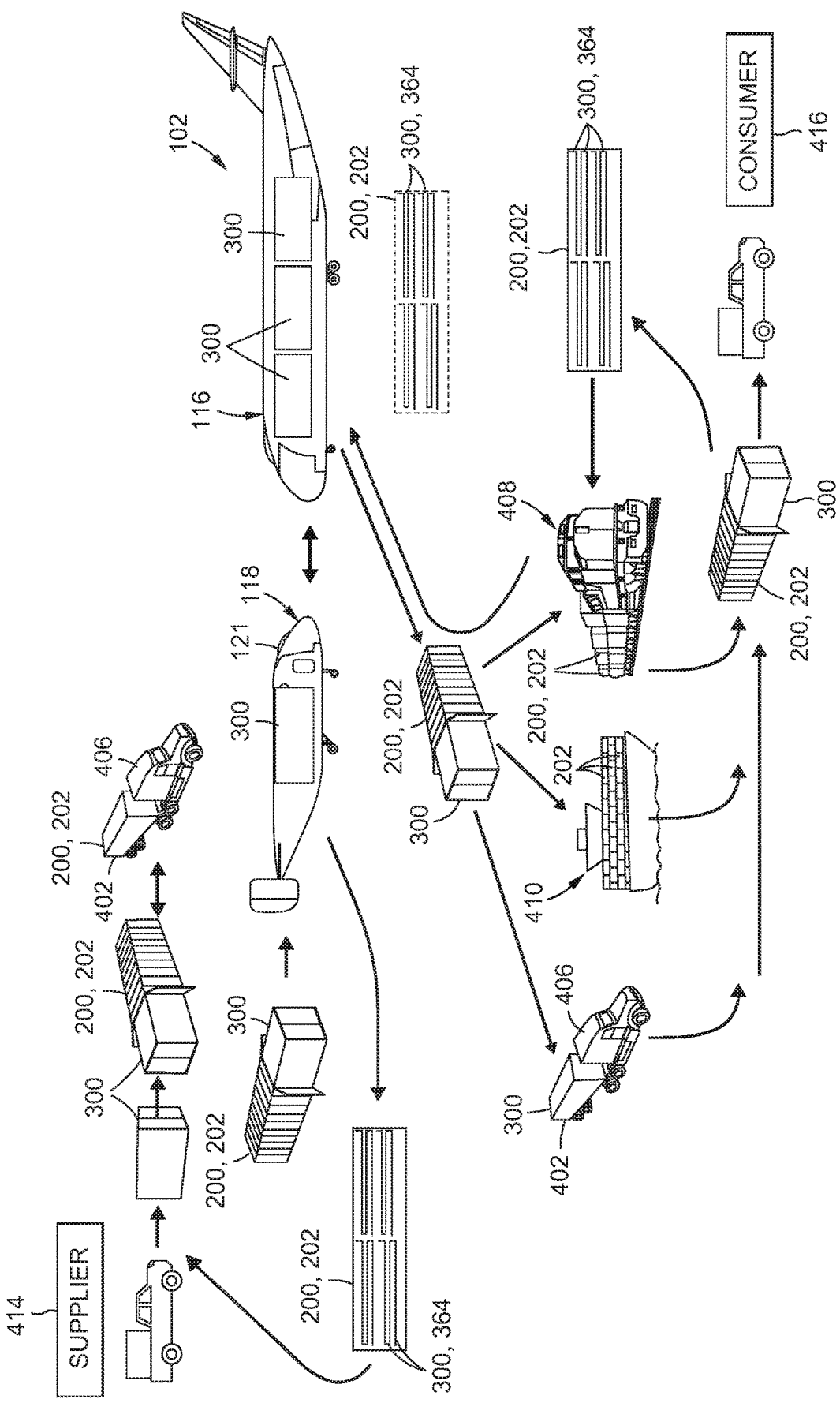
FIG. 53 is a schematic view of a freight delivery network for transporting freight using ISO-geometry containers for surface transport (e.g., ship, train, truck) and container inserts for air transport, and further illustrating the use of ISO-geometry containers to ship the container inserts in a folded state back to their original destination.

Referring to the flowchart of FIG. 52 with additional reference to FIG. 53, shown in FIG. 52 is a method 600 of transporting freight using a container insert 300 configured to be received within an ISO-geometry container 200, 202. The method includes step 602 of transferring the container insert 300 onto or off of a vehicle comprising a truck 406, a train 408, a ship 410, or an aircraft. For example, FIG. 53 schematically illustrates the transferring of container inserts 300 onto a feeder route aircraft 118 and/or a trunk route aircraft 102 as part of the process of shipping freight from a supplier 414 to a consumer 416. The method may further include transferring the container insert 300 into or out of an ISO-geometry container 200, 202. For example, FIG. 53 shows freight from a supplier 414 loaded into a container insert 300 which is subsequently loaded into an ISO-geometry container 200, 202. In some examples, the method may include slidably moving the container insert 300 into or out of the ISO-geometry container 200, 202 with the assistance of insert rollers 340 and/or insert rub strips 342 that may be mounted to at least one of the insert panels 312 as shown in FIGS. 25-28 and described above.

As shown in FIG. 53, the ISO-geometry container 200, 202 may be loaded onto a flatbed trailer 402 of a semi-truck 406 and transported to an airport. At the airport, the container insert 300 may be removed from the ISO-geometry container 200, 202 and loaded into an aircraft. In this regard, the method may include transferring the container insert 300 into a feeder route payload compartment 121 of a feeder route aircraft 118 (e.g., FIG. 17) or into a trunk route payload compartment 116 of a trunk route aircraft 102 (e.g., FIGS. 8-10). In other examples, the method may include directly transferring the container insert 300 between a feeder route aircraft 118 and a trunk route aircraft 102 as shown in FIG. 20 and schematically illustrated in FIGS. 22 and 53.

Referring to the example of FIG. 53, upon arrival at the destination airport, the container insert 300 may be unloaded from the trunk route aircraft 102 and transferred into an ISO-geometry container 200, 202. The ISO-geometry container 200, 202 may be transferred into another feeder route aircraft 118 (not shown) or the ISO-geometry container 200, 202 may be loaded onto any one a variety of surface transportation modes such as a flatbed trailer 402 of a semi-truck 406, a container ship 410 (e.g., configured to carry only standard-weight ISO-geometry containers 202), and/or a flatbed rail car of a train 408 as shown in FIG. 53. Upon arriving at the surface transportation destination, the container insert 300 may be transferred out of the ISO-geometry container 200, 202 (e.g., at the consumer 416) after which the freight may be unloaded from the container insert 300.

As shown in FIG. 53, the container inserts 300 when emptied may be shipped back to the place of origin. In this regard, the method may include transitioning the container insert 300 between an erected state 362 (FIG. 25) and a folded state 364 (FIG. 41) by folding the insert panels 312 (FIGS. 37-42) until the insert panels 312 are in a stacked arrangement as shown in FIGS. 32-42 and described above. In another example, the transitioning of the container insert 300 between an erected state 362 and a folded state 364 may include partially collapsing at least some of the insert panels 312 along an in-plane direction in an accordion style when transitioning the container insert 300 between the erected state 362 and the folded state 364 as shown in FIGS. 43-46 and described above. The method may include loading a plurality of container inserts 300 in the folded state 364 into an ISO-geometry container 200, 202 in stacked formation as shown in FIGS. 47-51 for shipping the container inserts 300 back to the place of origin as shown in FIG. 53.

As mentioned above, FIG. 53 is a schematic view of an example of a network for transporting freight from a sender (e.g., a supplier 414) to a recipient (e.g., a consumer 416) using ISO-geometry containers 200, 202 for surface transport (e.g., truck 406, train 408, ship 410) and using container inserts 300 for air transport. Routes where an air transport leg is required (e.g., due to short delivery time requirements) may be cost-justified using the presently-disclosed container system 198. Although the cost of air freight per ton-mile is many times higher than the cost to transport by truck 406, train 408, or ship 410, the air freight cost is reduced somewhat by using the presently-disclosed container inserts 300 which have a tare weight that is approximately 5-6 times less than the tare weight of a standard-weight ISO-geometry container 202 despite the useful volume of a container insert 300 being only 10-15 percent less than the useful volume of an ISO-geometry container 200, 202 of approximately the same size. Considering the relatively low cost per ton-mile for transporting by truck 406, train 408, and ship 410, the overall cost for moving freight along a route that requires an air leg improves when the air leg is relatively long and high-altitude. The container insert 300 further reduced shipping time and costs due to the avoidance of re-bulking operations as is otherwise required for conventional air freight when transitioning from ground transport mode (e.g., truck 406) to air transport mode.

For the presently-disclosed container inserts 300, the transition from ground transport to air transport may be relatively rapid due to the ability to quickly and easily slide the container inserts 300 in and out of the ISO-geometry containers 200, 202 due to the above-described insert rollers 340 (FIG. 25), insert rub strips 342 (FIG. 25) and/or other insert handling mechanisms that may be mounted to the container inserts 300. Costs and shipping times may also be reduced due to quicker customs clearance at ports of entry than for conventional air freight. The risk of damage to freight is also reduced due to the avoidance of re-bulking operations and easier customs clearance. For a large fleet operating over an extended period of time, the avoidance of re-bulking and easier customs clearance may result in an increased number of shipments and greater transport asset utilization with increased tonnage volume as a result of the increased number of shipments. The reduced weight of the lightweight container inserts 300 may result in reduced fuel cost over the entire shipping route for all transportation modes (e.g., surface and air). Furthermore, the reduction in shipping time may justify an increase in shipping prices with a resulting increase in profit margin.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the scope of the disclosure.

What is claimed is:

1. A method of transporting freight, comprising:
   transferring an ISO-geometry container or a container insert between a feeder route payload compartment of a feeder route aircraft and a trunk route payload compartment of a trunk route aircraft, the container insert configured to be received within the ISO-geometry container;
   the feeder route aircraft having a feeder route fuselage having the feeder route payload compartment configured to receive one of the following:
      a single 20-foot-long ISO-geometry container or two 10-foot-long ISO-geometry containers arranged end-to-end;
      a single 20-foot-long container insert or two 10-foot-long container inserts arranged end-to-end and configured to be received within an 20-foot-long ISO-geometry container; and
   the trunk route aircraft having a pressurized trunk route fuselage the having fuselage interior structure having two side-by-side trunk route payload compartments, each configured to receive one of the following:
      a plurality of ISO-geometry containers arranged end-to-end;
      a plurality of container inserts arranged end-to-end; and
      a combination of one or more ISO-geometry containers and one or more container inserts arranged end-to-end;
   wherein:
      each ISO-geometry container has a rectangular cross-sectional shape having four corners, an external width of 8 feet, and an external height of either 8 feet 6 inches or 9 feet 6 inches; and
      the feeder route aircraft and the trunk route aircraft each have:
         at least one wing for supporting the aircraft during flight; and
         at least one propulsor for forward propulsion of the aircraft.

2. The method of claim 1, wherein transferring the ISO-geometry container comprises:
   transferring an ISO-geometry container configured as a high-cube version of an ISO-geometry container.

3. The method of claim 1, wherein transferring the ISO-geometry container or the container insert includes:
   transferring the ISO-geometry container or the container insert into or out of one of the trunk route payload compartments, wherein said trunk route payload compartments comprise a double-bubble cross-sectional shape.

4. The method of claim 1, wherein the feeder route fuselage and the trunk route fuselage each have at least one door opening in at least one of a fuselage forward end and a fuselage aft end, each door opening having a door sill, the step of transferring the ISO-geometry container or the container insert includes:
   transferring the ISO-geometry container or the container insert when the door sills of the feeder route fuselage and the trunk route fuselage are no more than 5.5 feet higher above ground level.

5. The method of claim 1, wherein the feeder route fuselage and the trunk route fuselage each have at least one door opening in at least one of a fuselage forward end and a fuselage aft end, each door opening having a door sill, the method further including:
   adjusting, prior to transferring the ISO-geometry container or the container insert, a height of at least one landing gear of at least one of the feeder route aircraft and the trunk route aircraft for lowering a height of the door sill of at least one of the feeder route fuselage and the trunk route fuselage.

6. The method of claim 1, wherein:
   the trunk route fuselage has a horizontally-oriented double-bubble cross-sectional shape.

7. The method of claim 1, wherein:

the trunk route fuselage has a generally vertically-oriented longitudinal bulkhead configured to be loaded in tension when the trunk route fuselage is pressurized, the longitudinal bulkhead dividing the trunk route fuselage interior structure having into the two side-by-side trunk route payload compartments.

8. The method of claim 7, wherein:
each trunk route payload compartment has a cross-sectional shape and size configured to provide a maximum clearance of 2.50 inches at each of the four corners of a high-cube ISO-geometry container.

9. The method of claim 7, wherein:
the longitudinal bulkhead is a structural member configured to carry at least a portion of an internal pressurization load when the trunk route fuselage is pressurized.

10. The method of claim 7, wherein:
the trunk route aircraft has a vertical stabilizer located in an aft region of the trunk route aircraft; and
the longitudinal bulkhead is structurally coupled to the vertical stabilizer.

11. The method of claim 10, wherein:
the trunk route aircraft has an empennage that includes the vertical stabilizer and two tail surfaces, forming a Y-tail configuration.

12. The method of claim 1, wherein:
the feeder route fuselage and the trunk route fuselage each have a door sill on the fuselage forward end; and
at least one of the feeder route aircraft and the trunk route aircraft is configured such that when the feeder route aircraft and the trunk route aircraft are on ground, the door sill is no higher above ground level than a flatbed of a truck or an autonomous platform.

13. The method of claim 1, wherein:
at least one of the feeder route aircraft and the trunk route aircraft has at least one landing gear configured to be height-adjustable for lowering a height of at least one of the door sills above ground level.

14. The method of claim 1, wherein:
the feeder route fuselage is unpressurized.

15. The method of claim 1, wherein:
the feeder route fuselage has a cross-sectional shape having either straight sides or slightly rounded sides, and either rounded corners or sharp corners connecting the straight sides or slightly rounded sides.

16. The method of claim 1, wherein:
the feeder route fuselage includes a cargo supporting floor configured to support one or more ISO-geometry containers and/or container inserts; and
a wing-to-body joint located below the cargo supporting floor, and from which the at least one wing extends.

17. The method of claim 1, wherein:
the feeder route fuselage has a fuselage forward end having an upward-opening cargo door providing access to the feeder route payload compartment.

18. The method of claim 1, wherein:
the feeder route aircraft has a maximum range of 500 nautical miles.

19. The method of claim 1, further comprising:
operating the feeder route aircraft autonomously.

20. The method of claim 1, further comprising:
operating the trunk route aircraft autonomously.

\* \* \* \* \*